US012141889B2

(12) United States Patent
Otsuka et al.

(10) Patent No.: US 12,141,889 B2
(45) Date of Patent: Nov. 12, 2024

(54) DATA PROCESSING SYSTEM, DATA PROCESSING METHOD, AND COMPUTER PROGRAM

(71) Applicant: Sony Interactive Entertainment Inc., Tokyo (JP)

(72) Inventors: Katsushi Otsuka, Tokyo (JP); Mark Evan Cerny, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 226 days.

(21) Appl. No.: 17/627,253

(22) PCT Filed: Apr. 7, 2020

(86) PCT No.: PCT/JP2020/015622
§ 371 (c)(1),
(2) Date: Jan. 14, 2022

(87) PCT Pub. No.: WO2021/065052
PCT Pub. Date: Apr. 8, 2021

(65) Prior Publication Data
US 2022/0261945 A1  Aug. 18, 2022

Related U.S. Application Data

(60) Provisional application No. 62/909,274, filed on Oct. 2, 2019.

(51) Int. Cl.
*G06T 1/20* (2006.01)
*G06F 9/48* (2006.01)

(52) U.S. Cl.
CPC ............. *G06T 1/20* (2013.01); *G06F 9/4887* (2013.01)

(58) Field of Classification Search
CPC .... A63F 13/355; A63F 2300/203; G06T 1/20; G06F 9/4887; G06F 9/5072
See application file for complete search history.

(56) References Cited

U.S. PATENT DOCUMENTS

2009/0027402 A1* 1/2009 Bakalash .................. G06T 1/20
345/505
2016/0293134 A1 10/2016 Fortin
(Continued)

FOREIGN PATENT DOCUMENTS

| EP | 3385840 A2 | 10/2018 |
| JP | 2008289030 A | 11/2008 |

(Continued)

OTHER PUBLICATIONS

International Search Report for related PCT Application No. PCT/JP2020/015623, 4 pages, dated Jul. 14, 2020.
(Continued)

*Primary Examiner* — Sing-Wai Wu
(74) *Attorney, Agent, or Firm* — Matthew B. Dernier, Esq.

(57) ABSTRACT

A data processing system includes a GPU and a switching instruction section. The GPU performs in a time-divided manner a process of generating a plurality of pieces of data corresponding to a plurality of applications executed in parallel. In the case where the GPU completes a process of generating one unit of data that is data corresponding to a first application and that is to be handed over to subsequent processing sections, the switching instruction section instructs the GPU to switch to a process of generating an image corresponding to a second application different from the first application.

19 Claims, 16 Drawing Sheets

(56) References Cited

U.S. PATENT DOCUMENTS

2017/0221173 A1    8/2017   Acharya
2019/0196926 A1    6/2019   Jong

FOREIGN PATENT DOCUMENTS

| JP | 2017510862 A | 4/2017 |
|---|---|---|
| WO | 2012014625 A1 | 2/2012 |
| WO | 20160205975 A1 | 12/2016 |

OTHER PUBLICATIONS

Extended European Search Report for corresponding EP Application No. 20872373.4, 8 pages, dated Sep. 14, 2023.
Kun Dlan, et al, "A Full GPU Virtualization Solution with Mediated Pass-Through" Useniux Annual Technical Conference, pp. 121-132, dated Jun. 19, 2014 (See Non-Pat. Lit. #1).
International Search Report for corresponding PCT Application No. PCT/JP2020/015622, 4 pages, dated Jul. 14, 2020.
Richardson, T. et al., "The Remote Framebuffer Protocol", RFC 6143, www.rfc-editor.org/info/rfc6143>, 39 pages, Mar. 2011.

\* cited by examiner

FIG. 1
Multi apps execution methods
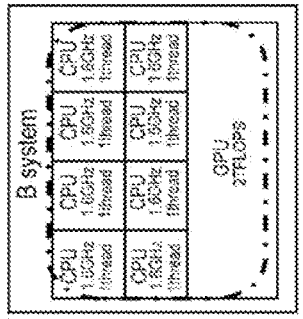
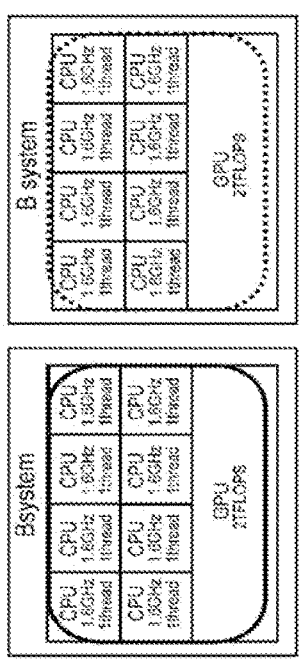
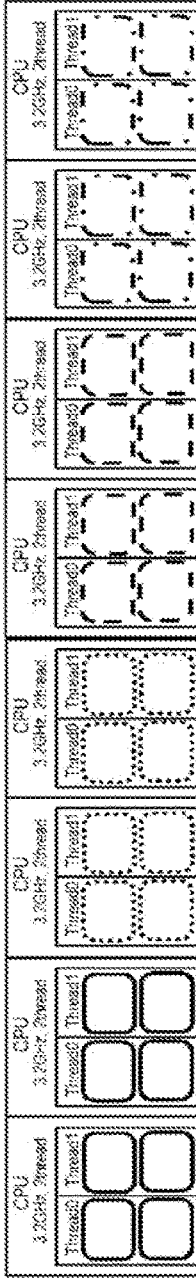

FIG. 2
Today's tech: Two methods or multi apps on Single GPU
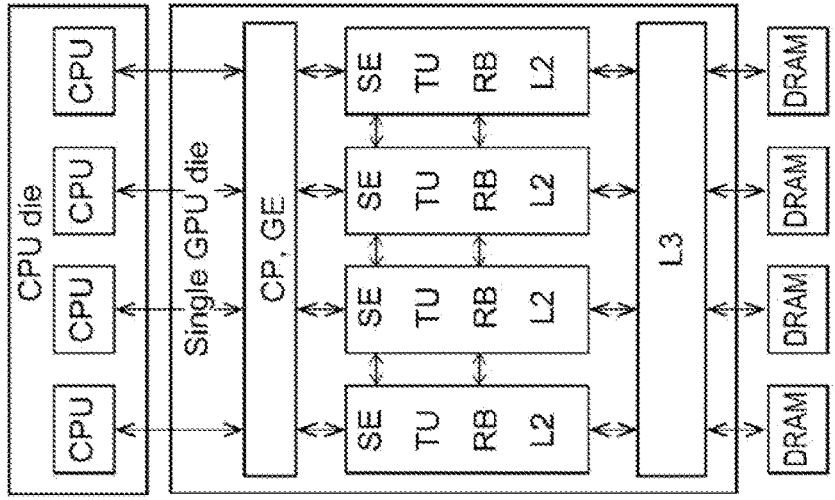
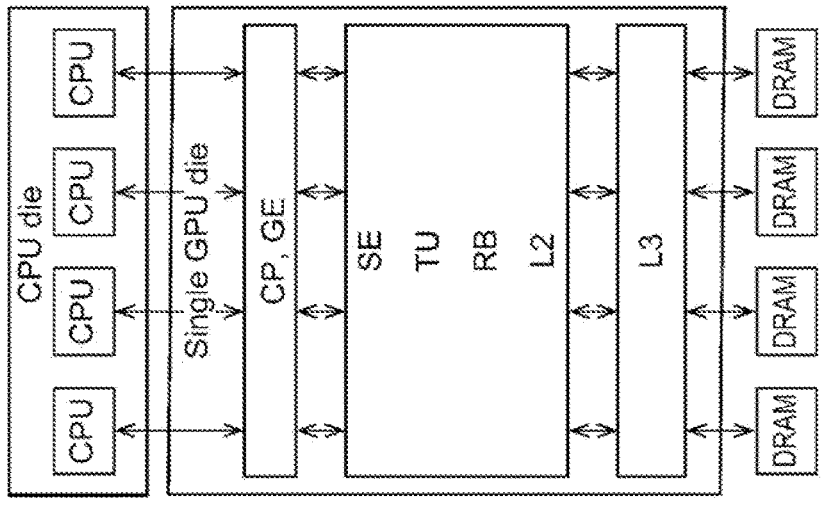

FIG. 3
Today's tech: Multi apps on Single GPU (A) GPU sharing by "Time division"

Cons. Large context switch overhead.
A game has many non-preempt processing and synchronizing.
It does not match high frequent context switching by small granularity.

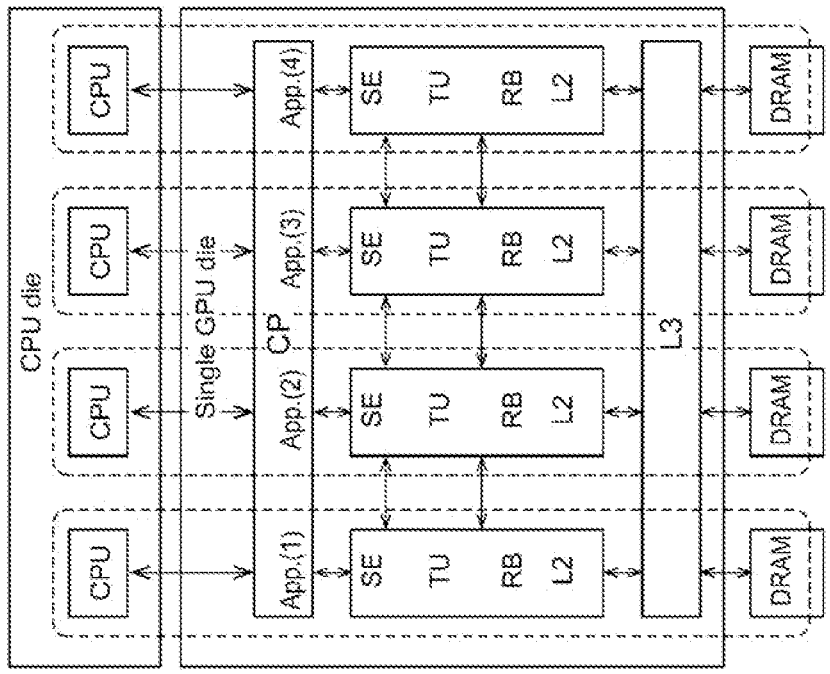

(B) GPU sharing by "Hardware partitioning"

Totally controllable. Guarantee real time execution, if non-parallel function blocks are extended to support multi apps.

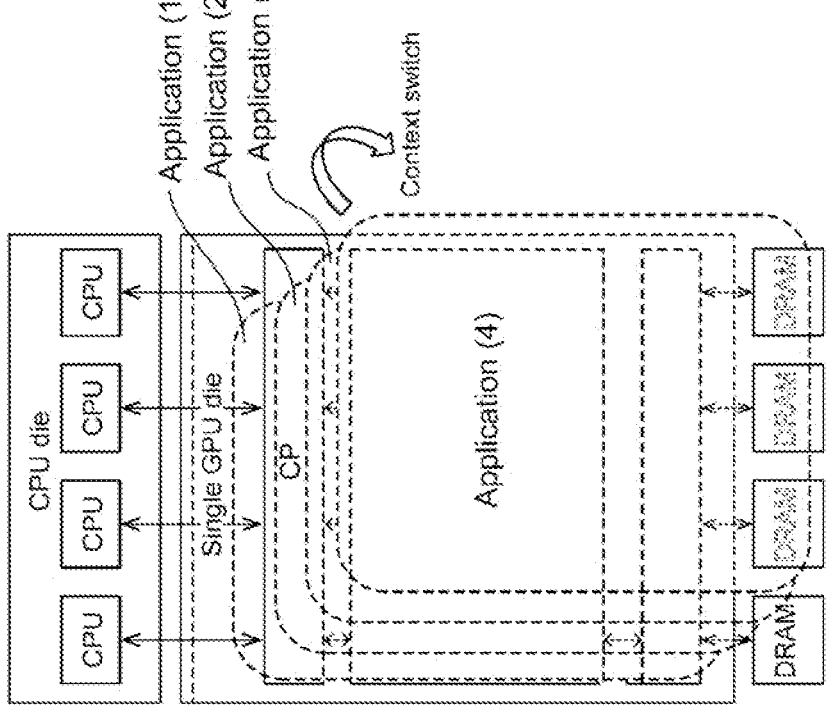

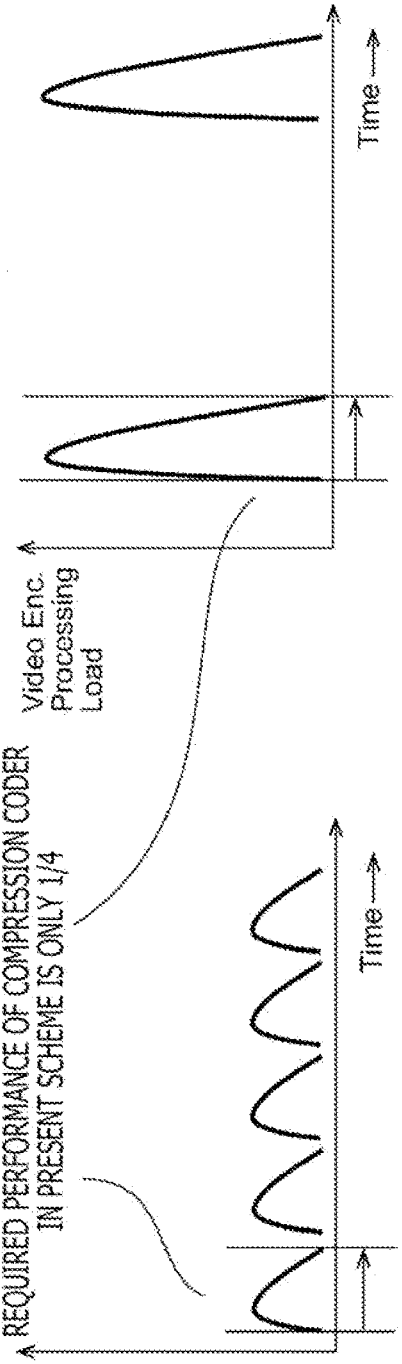

FIG. 4
RELATION BETWEEN COMPRESSION CODING OPERATION TIMINGS AND REQUIRED PERFORMANCE

CLOUD GAMING NEEDS TO QUICKLY DELIVER CONTENTS OF DRAWING BY SERVER
TO USER-MANIPULATED CLIENTS CONNECTED VIA NETWORK
→ REQUIRES COMPRESSION CODING WITH SMALL DELAY

PRESENT SCHEME  NUMBER OF PIXELS TO BE PROCESSED WITHIN 4ms: 1920×1080

COMPARISON IN CASE OF COMPLETING PROCESSING
WITH SAME PROCESSING DELAY INDICATES THAT
REQUIRED PERFORMANCE OF COMPRESSION CODER
IN PRESENT SCHEME IS ONLY 1/4

NUMBER OF PIXELS TO BE PROCESSED WITHIN 4ms: 1920×1080×4
→ REQUIRES 4 TIMES HIGHER PERFORMANCE THAN PRESENT SCHEME

IF PROCESSING PERFORMANCE IS SAME AS THAT
OF PRESENT SCHEME, PROCESSING TAKES 16ms

FIG. 9
GPU sharing by time division
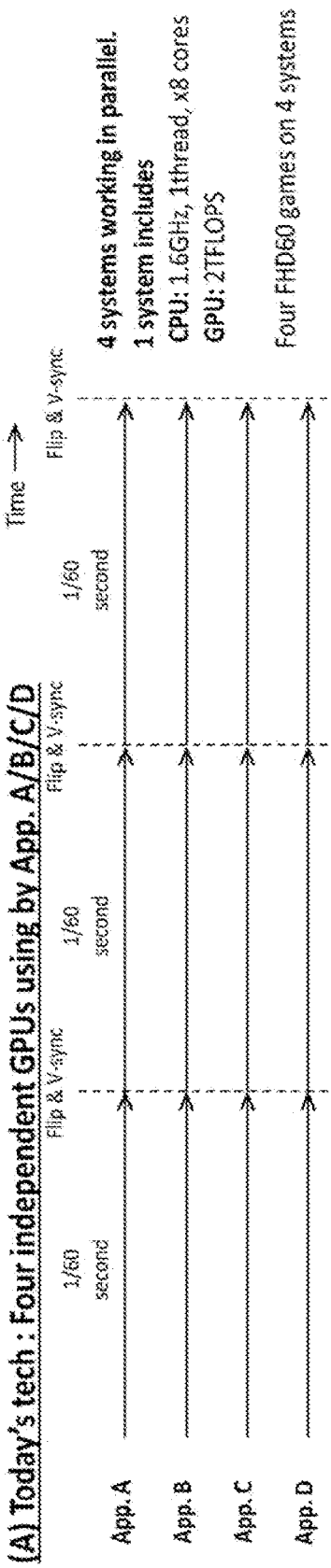
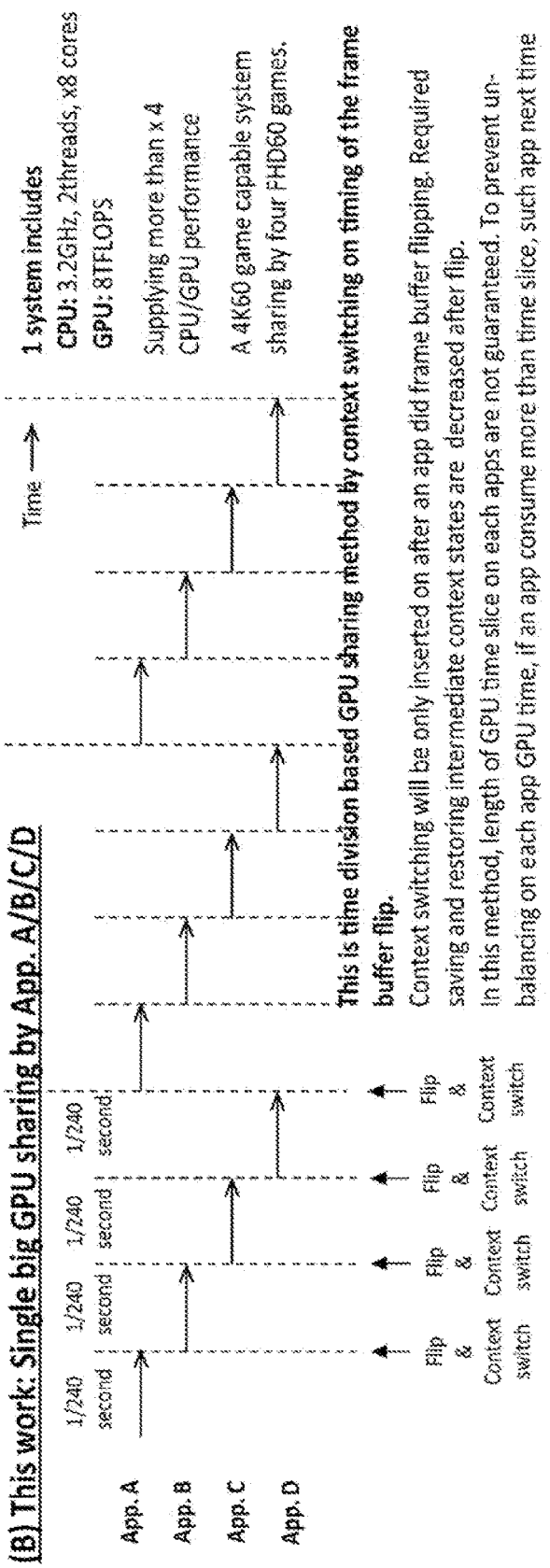

FIG. 10
Detail of GPU sharing by time division
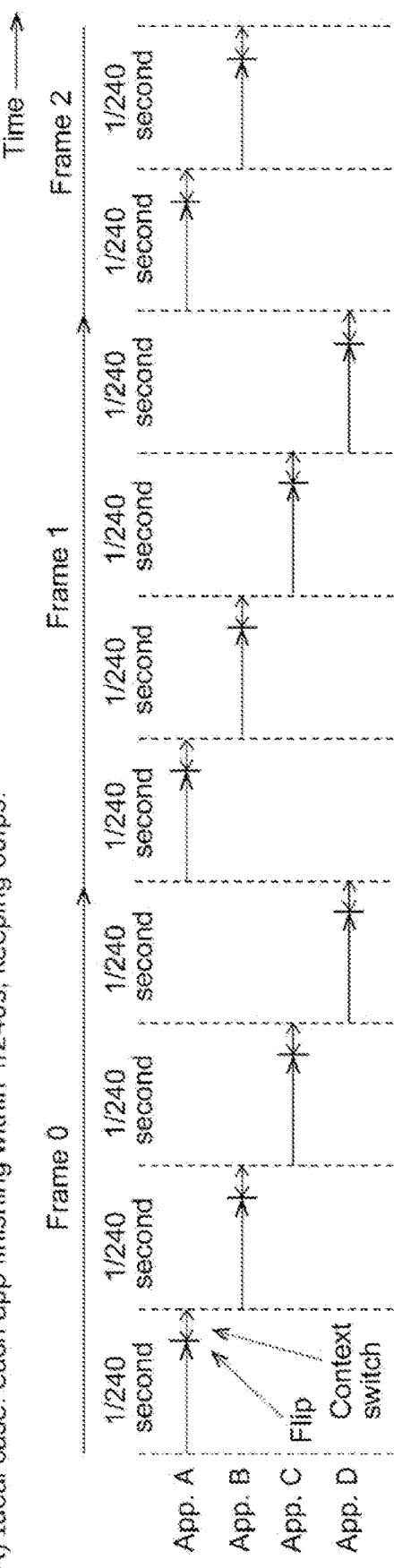
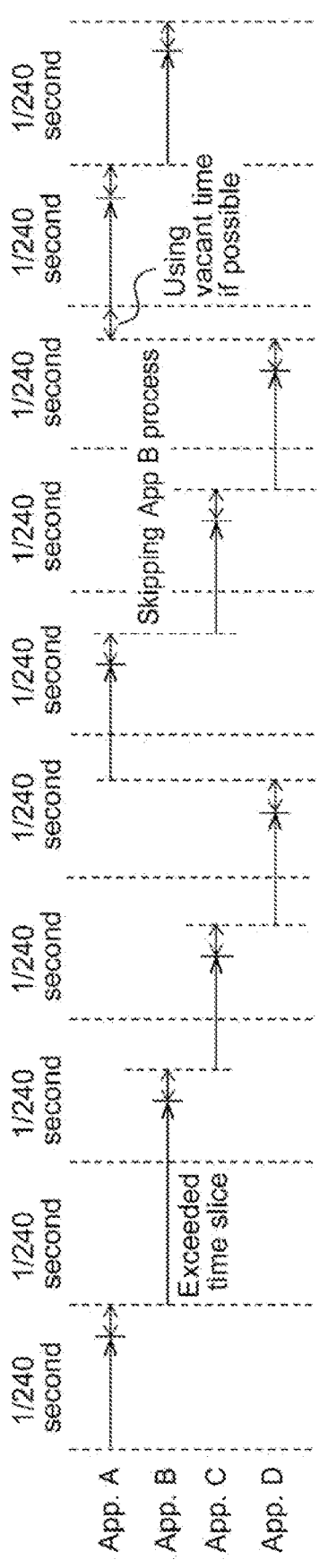

Detail of GPU sharing by time division

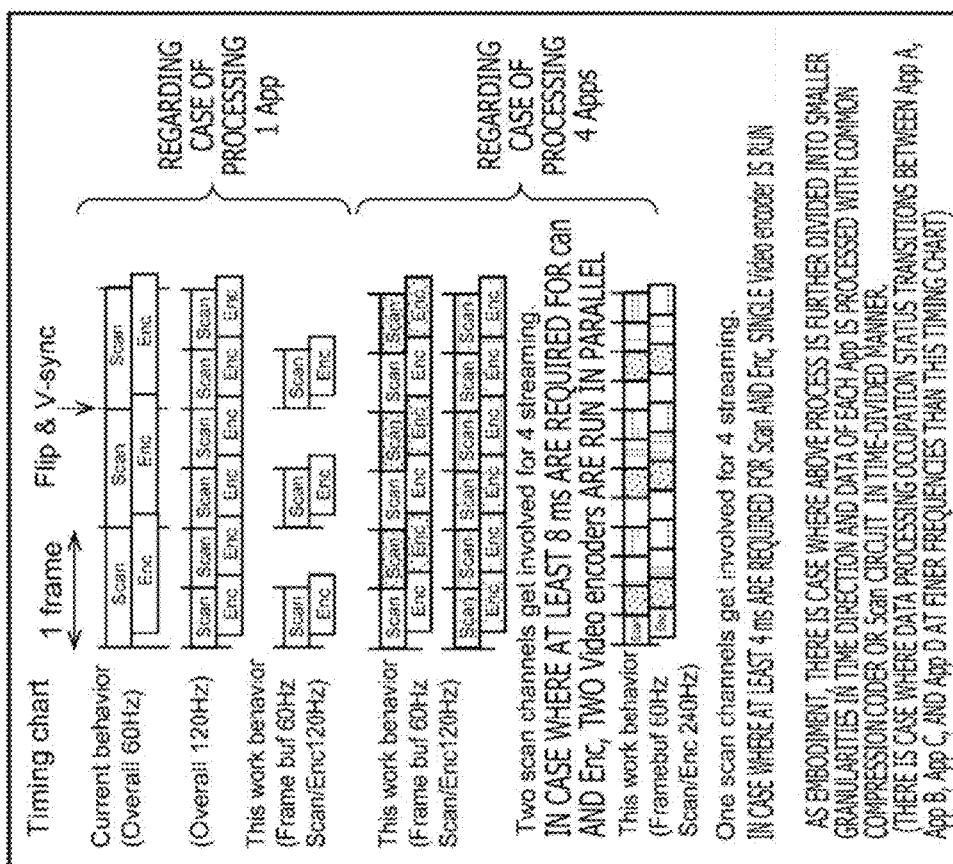
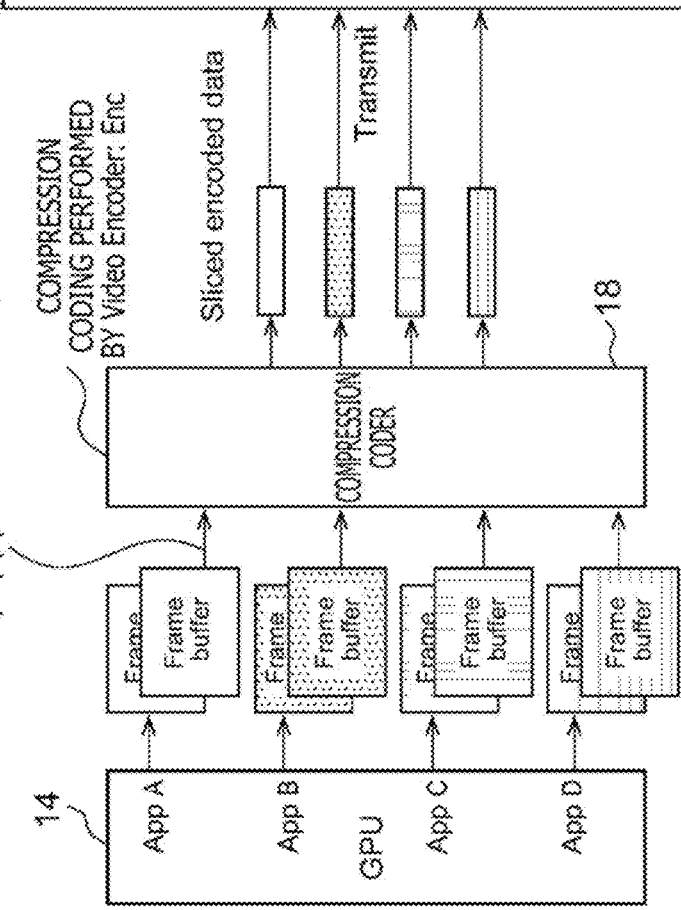
FIG. 12
RELATION BETWEEN COMPRESSION CODING OPERATION TIMINGS AND REQUIRED PERFORMANCE

DATA PROCESSING SYSTEM, DATA PROCESSING METHOD, AND COMPUTER PROGRAM

TECHNICAL FIELD

The present invention relates to a data processing technology and, particularly, to a data processing system, a data processing method, and a computer program.

BACKGROUND ART

A server in a cloud sometimes generates, for a plurality of clients in parallel, respective images corresponding to a plurality of applications (e.g., games) being executed by the plurality of clients, delivers the image generated for each client to the client, and causes the image to be displayed.

SUMMARY

Technical Problem

The present inventors contemplated that a server for generating a plurality of images corresponding to a plurality of applications and delivering the generated images to respective clients leaves room for improvement from the viewpoint of efficiency.

The present invention has been devised on the basis of the above idea of the present inventors, and it is an object of the present invention to provide a technology for streamlining a process of generating a plurality of images corresponding to a plurality of applications or a process of delivering the generated images to respective clients.

Solution to Problem

In order to solve the above problem, a data processing system of an aspect of the present invention includes a GPU and an instruction section. The GPU performs in a time-divided manner a process of generating a plurality of pieces of data corresponding to a plurality of applications executed in parallel. In the case where the GPU completes a process of generating one unit of data that is data corresponding to a first application and that is to be handed over to subsequent processing sections, the instruction section instructs the GPU to switch to a process of generating data corresponding to a second application different from the first application.

Another aspect of the present invention is a data processing method. This method is performed by a data processing system that includes a GPU and an instruction section. The data processing method includes a step, performed by the GPU, of performing in a time-divided manner a process of generating a plurality of pieces of data corresponding to a plurality of applications executed in parallel; and a step, performed by the instruction section, of instructing the GPU, in the case where the GPU completes a process of generating one unit of data that is data corresponding to a first application and that is to be handed over to subsequent processing sections, to switch to a process of generating an image corresponding to a second application different from the first application.

It should be noted that any combinations of the above components and conversions of expressions of the present invention between an apparatus, a program, a recording medium storing a program, and so on are also effective as modes of the present invention.

Advantageous Effects of Invention

The present invention can streamline a process of generating a plurality of images corresponding to a plurality of applications or a process of delivering the generated images to respective clients.

BRIEF DESCRIPTION OF DRAWINGS

FIG. 1 is a diagram illustrating methods for executing a plurality of applications.
FIG. 2 is a diagram illustrating examples of sharing a GPU among a plurality of applications.
FIG. 3 is a diagram illustrating examples of sharing a GPU among a plurality of applications.
FIG. 4 is a diagram illustrating a relation between compression coding operation timings and required performance.
FIG. 9 is a diagram illustrating an example of sharing a GPU in a time-divided manner.
FIG. 10 is a diagram illustrating examples of sharing a GPU in a time-divided manner.
FIG. 12 is a diagram illustrating operation of a compression coder in the case where a plurality of applications are processed in parallel.

DESCRIPTION OF EMBODIMENT

Figure 5:
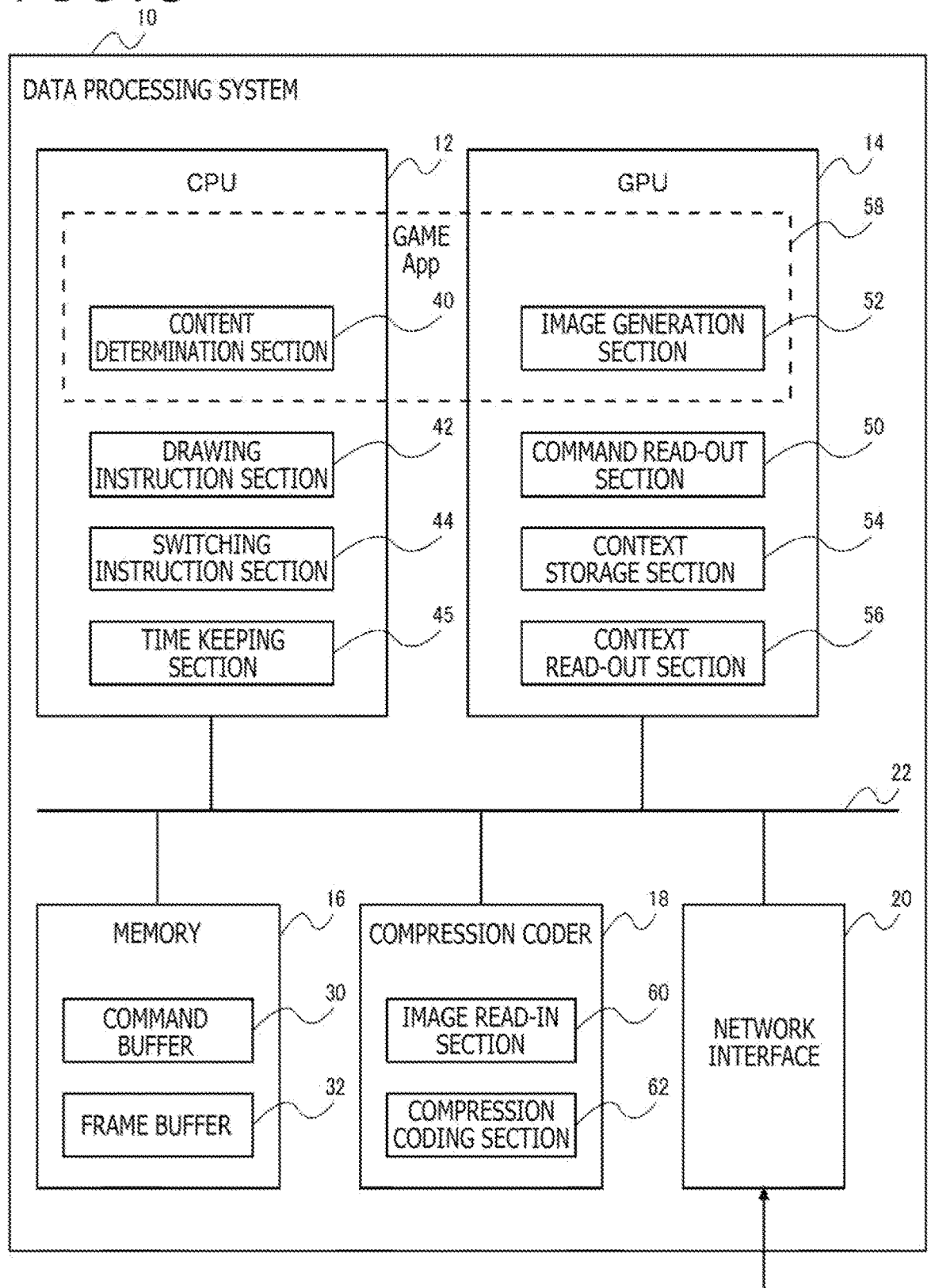
FIG. 5 is a block diagram illustrating functional blocks of a data processing system of a working example.

<Background>
FIG. 1 illustrates methods for executing a plurality of applications. It is assumed that two systems are available, a system A and a system B. The system A is equipped with relatively high-performance CPU (Central Processing Unit) and GPU (Graphics Processing Unit) capable of processing game applications (hereinafter referred to as "game Apps") up to 60 fps (frames per second) with 4K resolution (3840× 2160). The system B is capable of processing game Apps up to 60 fps with FHD (Full High Definition) resolution (1920× 1080). The system A is substantially four times higher in performance than the system B. It is assumed that the system A is upward-compatible with the system B.

Here, when there is a need to simultaneously execute a plurality of game Apps of 60 fps quality with FHD resolution, a first possible option would be to install and simultaneously use a plurality of systems B as illustrated in the upper part of FIG. 1. Also, a second possible option would be to process the plurality of game Apps in parallel in the single system A (e.g., processing four games in parallel) as illustrated in the lower part of FIG. 1. The present working example relates to the second option and proposes a technology for realizing physical reduction in the number of systems installed and improvement in operating efficiency per system.

In the present working example, a data processing system is proposed that achieves parallel processing of a plurality of applications, that is, parallel processing of multiple contexts, processing delay reduction, and peak performance reduction in a compression coding section at the same time. An outline will be given first of technical ideas of the present working example.

<Technical Idea 1 of the Working Example>

As a technical idea 1 of the working example, a description will be given of a method for efficiently processing a plurality of game Apps by using a single GPU of a server provided in a cloud (also referred to as a "cloud server").

(1) Problem:

Methods for executing a plurality of applications with a single CPU have become common. For example, it is possible to execute a plurality of applications in parallel by dividing a CPU's arithmetic unit in a spatial direction (also referred to as "space division"). Alternatively, it is possible to execute a plurality of applications in parallel by dividing a CPU's arithmetic unit in a time direction (also referred to as "time division"). Space division of the arithmetic unit refers to assigning each application to one of a plurality of CPUs or one of a plurality of threads of a single CPU. Time division of the arithmetic unit refers to sharing a single CPU among a plurality of applications in a time-divided manner.

Here, also in the case where a single GPU handles processing of a plurality of applications, a possible option would be to divide the arithmetic unit in space or in time, which, however, involves a problem specific to a GPU. FIGS. 2 and 3 illustrate examples of sharing a single GPU among a plurality of applications. FIGS. 2A and 3A illustrate examples of sharing a GPU through time division, and FIGS. 2B and 3B illustrate examples of sharing a GPU through space division. In each figure, "CP" in the GPU refers to a command processor that processes commands received from the CPU, "SE" refers to a shader engine that performs a shader process, "TU" refers to a texture unit that performs a texture process, "RB" refers to a rendering back end that performs a rendering process, and "L2" and "L3" refer to level 2 cache and level 3 cache, respectively.

(1-1) Problem in the Case of Dividing the GPU in Space:

A GPU commonly incorporates in parallel a number of arithmetic units that perform a shader process and general-purpose computing, and a possible option would be to physically divide these arithmetic units and assign one of the arithmetic units to each application for exclusive use. For example, in the case where 2048 pipelines of shader arithmetic units are available in a GPU, a possible option would be to assign 512 pipelines to each of four applications. However, functional blocks that handle tessellation, rasterization, and so on are commonly built on the premise that a single GPU performs a serialized process. In order to divide the GPU in space, for this reason, it is practically necessary to provide these functional blocks in parallel in a single GPU, thus resulting in increased cost.

(1-2) Problem in the Case of Dividing the GPU in Time:

(1-2-1) Context Switch Overhead

A plurality of applications use, one after another, the same arithmetic unit. As a result, each time a transition (also referred to as a "context switch") takes place, it is necessary to evacuate and read out internal states. The GPU commonly incorporates in parallel a number of arithmetic units (also referred to as "unified shaders") for handling a pixel/vertex shader process and general-purpose computing, and these arithmetic units originally have mechanisms for reducing the context switch overhead caused, for example, by multiplexing of internal state storage locations in consideration of preemptive parallel processing of a plurality of processes in a time-divided manner. However, fixed functions other than the unified shaders are restricted with respect to consideration of time division. Although the transition time period can be reduced, for example, by multiplexing registers that hold the internal states, as well, here, the GPU as a whole has an enormous amount of internal data, thus making aggravation in chip area efficiency attributable to increased circuit scale non-negligible.

Also, no problem arises even if context information or accessed data is shared among a plurality of processes being performed preemptively within a single application. However, sharing of such information and data among a plurality of applications is not permitted, and it is necessary to repeat evacuation and read-out of these pieces of information and data each time a context switch takes place.

Also, GPU processing pipelines are extremely longer than those of the CPU, and a significant delay occurs from fetching of a command buffer to the end of a command-based process. During a context switch, it is necessary to wait for all processes in the pipelines to be completed after halting supply to the pipelines, and this results in an increased amount of time.

Also, the GPU employs far more pieces of internal state information than the CPU, and none of a plurality of kinds of overheads required for a context switch are negligible. The plurality of kinds of overheads include a processing time period required to evacuate and read out internal states, circuitry required for multiplexing to avoid this, and a wait time period until end of internal processing in the pipelines.

(1-2-2) Configuration of Game Application Processes:

In a game App, a series of preemptive processes using unified shaders is bundled together, and a single serialized process of eventually generating drawing results in frame buffers in step with display timings on a display is carried out as a whole. That is, a game App may exist whose time-divided execution is not possible, unlike those applications that handle only general-purpose computing (also referred to as "GPGPU"), because a plurality of internal processes are partly highly serialized by means such as wait for synchronization. Even if context switch overheads can be ignored, the processes cannot be handled in some cases from the viewpoint of the processing structure of the game App.

(2) Solution Technology:

(2-1) To set a granularity of dividing a GPU process in time to the timing when the game App finishes its drawing process to the frame buffer. The GPU in the data processing system of the working example performs a process of generating a plurality of pieces of data corresponding to a plurality of applications executed in parallel in a time-divided manner. Then, in the case where the GPU completes the process of generating one unit of data which is data corresponding to a first application and which will be handed over to subsequent processing sections, an instruction section (switching instruction section 44 described later) of the data processing system of the working example instructs the GPU to switch to a process of generating data corresponding to a second application different from the first application. One unit of data is a final product which will be handed over to the subsequent processing sections and may be, for example, one frame (image) which will be stored in a frame buffer.

In the working example, a granularity of dividing a GPU process in time is set to the timing when frame buffers are flipped. Normally, two or more frame buffers are secured per game App and are used while at the same time switching between a target to be drawn and a target to be displayed, and this switching is referred to as a "flip."

The GPU proceeds with its processes by fetching a command buffer generated by the CPU or other section. After fetching commands associated with one frame's worth of drawing of a game App, the GPU halts subsequent fetches, recognizes that the GPU internal processes have ended when a flip occurs, and begins to save the context of the game App. If there is an ongoing asynchronous computing process which is not in synchronism with frames, the GPU also halts the process and similarly saves the context. Thereafter, the GPU loads the context, which has been stored, of the game App to be executed next and resumes the execution of that game App. The context includes GPU internal states and contents of command buffers. It should be noted that, in the case where non-coincidence in time between the drawing process and the display process can be guaranteed, only one frame buffer may be used. However, a flip notice is issued to signal that the frame buffer is accessible.

In the GPU, internal states and intermediate data that require evacuation for a context switch diminish immediately after the drawing ends (i.e., when a flip takes place) as compared to while the drawing is in progress. The reason for this is that, while a drawing process is in progress, internal states and intermediate data of small granularity associated with the drawing process being executed on the fly exist in large amounts in the parallel arithmetic units (e.g., shader pipelines) and fixed functions (e.g., rasterizer). Also, some parts of the drawing process are highly serialized by means such as wait for synchronization that is difficult to divide in time. Further, there is a case where a blanking interval of a display timing is inserted after a flip. At that time, the GPU processes are not required in some cases. Therefore, it is advantageous to perform a context switch when a flip takes place in order to reduce and hide overheads.

(2-2) To perform a context switch during a blanking interval of a display timing.

It should be noted that, although a display output device is often not connected to a cloud gaming server, the timing when frame buffers are handed over to a compression coding circuit may be treated as a blanking interval.

(2-3) To set such that a GPU has at least a computing capability equal to a combined total of GPU computing capabilities required by the respective applications executed in parallel.

For example, in the case where a game App that generates FHD (1980×1080) images at 60 fps requires 2 TFLOPS (Tera Floating-point Operations Per Second) as its GPU computing capability and four such game Apps are executed in parallel, a GPU having at least an 8 TFLOPS computing capability is used.

(2-4) To cause the GPU to run at a frame rate equal to a combined total of expected processing frame rates of the respective applications executed in parallel in a time-divided manner.

For example, in the case where four game Apps, each generating 60 fps, are executed in parallel, the GPU frame rate is 240 Hz, that is, a context switch is performed at 240 Hz.

(2-4-1) A context switch is delayed in the case where a target application to be executed in parallel in a time-divided manner occupies the GPU beyond a time slice described in 2-4. A next time slice for the application that has occupied the GPU beyond its time slice is skipped, or a next time slice for the application is reduced.

(2-4-2) The number of applications executed in parallel is reduced to ensure that the GPU is assigned to each application at a sufficient frequency in the case where the GPU occupation by a target application executed in parallel in a time-divided manner exceeds the time slice by a large time margin or at a high rate. For example, an expected processing load (predicted value of processing load) of each application may be recognized in advance. Alternatively, a GPU occupation time period assigned to each of a plurality of applications may be reviewed after assigning a GPU occupation time period to each application, starting the execution, and then measuring a processing time period excess level (e.g., drawing frame rate count) and an increase level in delay with respect to user input.

In the case where, while a first system is running, an application arises that should be reassigned to a different system (second system) (referred to as a "relocated application"), the relocated application is activated first in the second system, and a context copy from the first system is initiated. Until these setups are completed, processing of the relocated application is also continued in the first system. Then, processing of the relocated application in the first system is halted from a context switch at a certain timing onward.

(2-5) To set such that the CPU has at least a computing capability equal to a combined total of computing capabilities required by the respective applications executed in parallel in a time-divided manner and operates in synchronism with the drawing frame rate of the GPU.

The CPU performance may be realized by a combination of an operating frequency, a CPU core count, a thread count, and so on. For example, suppose that a system executes, in a cloud server, four game Apps in parallel, each using eight single-threaded CPUs that run at 1.6 GHz. In this system, eight double-threaded CPUs having the same architecture and running at 3.2 GHz may also be used. Also, in the case where each of the four game Apps to be executed in parallel requires a 100 GFLOPS (Giga Floating-point Operations Per Second) computing capability, a CPU having at least a 400 GFLOPS computing capability may be used.

(2-6) To provide a GPU command buffer for each application and switch the target to be referred to by the GPU when a context switch takes place.

(2-6-1) A still another command buffer may be provided for a computing process that is asynchronous to the drawing process.

(2-7) To provide information indicating by which application each of the frame buffers generated one after another has been generated, when it has been generated, and when it should be displayed to GPU's subsequent processing steps. The GPU's subsequent processing steps include, for example, a compression coding section, a decompression section (decoding section), a communication section, and a display section.

<Technical Idea 2 of the Working Example>

As a technical idea 2 of the working example, a description will be given of a method for efficiently compressing and coding a plurality of images of a plurality of game Apps stored in frame buffers in a cloud server and transferring the compressed and coded images to clients.

(1) Problems:

In the case where a plurality of frame buffers are generated simultaneously and compressed and coded simultaneously, following execution of a plurality of game Apps in a cloud server, and the frame buffers are sent to a client with a small delay, a compression coder in general needs to have enough concurrency and computing capability to process the frame buffers generated simultaneously in parallel. For example, in the case where four game Apps, each of which should generate images with 1920×1080 resolution at 60 Hz, are executed in parallel and four frame buffers are thereby completed simultaneously, the system needs to have, in parallel, four compression coders capable of compressing and coding images with 1920×1080 resolution at 60 Hz. This may result in increased system cost.

Also, if one attempts to store a plurality of images for a plurality of game Apps temporarily in a plurality of frame buffers and compress and send these images with a small delay, a compression coder with higher performance is required (refer to the right side in FIG. 4 to be described later). Also, if one attempts to store a plurality of images for a plurality of game Apps temporarily in a plurality of frame buffers and compress and send these images with a small delay, an interconnect (bus) for inputting data to and outputting data from the compression coding section and a memory bandwidth are also required to have higher performance. Also, if one attempts to store a plurality of images for a plurality of game Apps temporarily in a plurality of frame buffers and compress and send these images with a small delay, a peak power consumption increases.

(2) Solution Technology:

The above problems are solved by providing a compression coder with a mechanism for efficiently processing a plurality of streams and serializing timings for a plurality of game Apps to generate frame buffers. A specific configuration will be described in 2-1 to 2-6 below.

(2-1) To serialize timings when a plurality of game Apps terminate their drawing to the frame buffers.

In the plurality of game Apps being executed in parallel, for example, GPU processing start times of the game Apps may be shifted with respect to each other. Also, flip timings or vertical synchronization timings may be shifted with respect to each other in the plurality of game Apps being executed in parallel. Although a display output device is often not connected to a cloud gaming server, the timing when frame buffers are handed over to the compression coding circuit may be virtually treated as a vertical synchronization timing. It should be noted that, in order to realize the technical idea 2, the parallel execution of a plurality of game Apps may be realized by using a plurality of GPUs or by dividing the arithmetic units of a single GPU in space or time.

FIG. 4 illustrates a relation between compression coding operation timings and required performance. It is assumed here that four game Apps (game AppA to game AppD), each generating images with 1980×1080 resolution at 60 fps, are executed in parallel and that the images of the four game Apps are stored in the frame buffers. In a scheme 70, images of the four game Apps are stored simultaneously in the frame buffers. The number of pixels required to be processed within four milliseconds in the scheme 70 is 1920×1080×4. In a scheme 72 of the working example, on the other hand, images of the four game Apps are stored in the frame buffers at different timings from each other. For this reason, the number of pixels required to be processed within four milliseconds in the scheme 72 is 1920×1080. Therefore, the scheme 72 of the working example can realize compression coding with a small delay and keep required performance of the compression coder to a minimum at the same time.

(2-2) To generate frame buffers at a frame rate equal to the combined total of expected processing frame rates of a plurality of applications executed in parallel. In other words, to generate a plurality of images corresponding to a plurality of applications at a frame rate equal to the combined total of expected frame rates of a plurality of applications executed in parallel.

For example, in the case where four game Apps, each of which should generate images at 60 fps, are executed in parallel, frame buffers are generated at 240 Hz.

Also, for example, in the case where a plurality of applications executed in parallel are four games in total, that is, a game A, a game B, a game C, and a game D, frame buffers are generated in the order of the game A, the game B, the game C, the game D, the game A, the game B, the game C, the game D, and so on. It should be noted, however, that, in the case where a per-frame processing time period of each application is variable, the order of generation of the frame buffers may be changed. In that case, information indicating by which application each frame buffer has been generated is stored. It should be noted that the frame buffers generated by each application need not necessarily be placed in the same shared memory area and that the compression coder may refer to a plurality of memory areas in sequence.

(2-3) To set such that the compression coder is at least capable of conducting compression coding at a frame rate equal to the combined total of frame rates of a plurality of applications executed in parallel.

For example, in the case where four game Apps, each generating images with 1920×1080 resolution at 60 fps (60 Hz), are executed in parallel, a compression coder capable of processing images with 1920×1080 resolution generated at 240 fps (240 Hz) is used.

(2-4) To set such that the compression coder codes, in sequence, a series of frame buffers output from a plurality of game Apps and then outputs coded data in a divided manner for each game.

In this case, the compression coder has a configuration capable of recognizing which frame buffer belongs to which game. For example, a frame buffer to which to output images may be provided for each game. Also, in the case where a plurality of game images are output to a single frame buffer, a tag indicating to which game an image belongs may be added to image data. Also, data may be handed over to different transmitters on a game-by-game basis.

(2-5) To set such that the compression coder retains past image frames output from a game and in-process data during compression coding in a manner distinguished from other games and ensures improved compression efficiency by referring thereto during compression coding of new images output from the game.

Also in this case, the compression coder has a configuration capable of recognizing which frame buffer belongs to which game.

For example, it is assumed that frame images A1 and A2 of the game A, frame images B1 and B2 of the game B, frame images C1 and C2 of the game C, and frame images D1 and D2 of the game D are output in the order of A1, B1, C1, D1, A2, B2, C2, and D2. In this case, the compression coder does not refer to the A2 for forward reference in compressing and coding the B2 and, instead, refers to the B1 data stored in advance or in-process data that arises during compression coding of the B1.

(2-6) To set such that the compression coder ensures processing with a small delay by performing compression coding in units of a partial image, part of an application image, and outputting coded data in sequence in units of a partial image.

<Details of the System of the Working Example>

A description will be given below of a configuration for realizing the above technical ideas.

FIG. 5 is a block diagram illustrating functional blocks of a data processing system of the working example. A data processing system 10 is a system that functions as a unit for processing an application, and a cloud server includes one or more data processing systems 10. The data processing system 10 includes a CPU 12, a GPU 14, a memory 16, a compression coder 18 (also referred to as a "video encoder"), and a network interface 20. These elements are connected to each other via a bus 22. The GPU 14 and the compression coder 18 are provided, one each, in the data processing system 10.

In the block diagram of the present specification, each of the elements described as a functional block for performing various processing tasks can include, in terms of hardware, a circuit block, a memory, and other LSI (Large Scale Integration) circuit, and is realized, in terms of software, by a program loaded into a memory and so on. Therefore, it is to be understood by a person skilled in the art that these functional blocks can be realized in various ways such as by hardware alone, software alone, or a combination thereof and are not limited to any one of them. For example, a computer program including a module corresponding to a functional block in the CPU 12 or the GPU 14 illustrated in the block diagram may be installed to a storage of the data processing system 10. The CPU 12 and the GPU 14 may achieve the functions of the respective functional blocks by reading the computer program into the memory 16 and executing the computer program.

The memory 16 stores data referred to or updated by the CPU 12, the GPU 14, and the compression coder 18. The memory 16 includes a command buffer 30 and a frame buffer 32. The command buffer 30 stores commands (e.g., commands specifying contents of drawing) issued by the CPU 12 to the GPU 14. In the working example, the command buffer 30 includes a plurality of different buffers, one for each of the game Apps to be executed in parallel. An individual command buffer for each game App is also referred to as an "individual App command buffer." The frame buffer 32 stores image data generated by the GPU 14. In the working example, the frame buffer 32 includes a plurality of different buffers, one for each of the game Apps to be executed in parallel. An individual frame buffer for each game App is also referred to as an "individual App frame buffer."

Here, a command buffer that stores a drawing instruction, that is, an instruction for data processing performed synchronously with switching between applications to be executed by the GPU 14 will be referred to as a first command buffer. The command buffer 30 may include a second command buffer that is different from the plurality of first command buffers corresponding to the plurality of game Apps and stores an instruction for data processing performed asynchronously with switching between applications to be executed by the GPU 14. The data processing performed asynchronously with switching between applications to be executed may be, for example, a general-purpose computing process other than image processing. The GPU 14 may read out a command from the second command buffer and perform the general-purpose computing process regardless of the application to be performed.

The network interface 20 communicates with client apparatuses in accordance with a predetermined communication protocol. In the working example, the client apparatuses are information processing apparatuses (e.g., PCs, smartphones, or gaming consoles) of users who play games, display game images generated by the data processing system 10, and receive users' manipulations on the games. The network interface 20 hands over users' manipulation information, sent from the client apparatuses, to the CPU 12. Also, the network interface 20 sends image data, compressed and coded by the compression coder 18, to the client apparatuses.

The CPU 12 includes a content determination section 40, a drawing instruction section 42, a switching instruction section 44, and a time keeping section 45. The GPU 14 includes a command read-out section 50, an image generation section 52, a context storage section 54, and a context read-out section 56. The content determination section 40 and the image generation section 52 perform processes dependent on each of a plurality of game Apps 58 executed in parallel. The compression coder 18 includes an image read-in section 60 and a compression coding section 62. At least some of the functional blocks included in the CPU 12, the GPU 14, and the compression coder 18 illustrated in FIG. 5 may be implemented as a computer program. The CPU 12, the GPU 14, and the compression coder 18 may achieve the functions of the respective functional blocks by executing the computer program.

Figure 6:
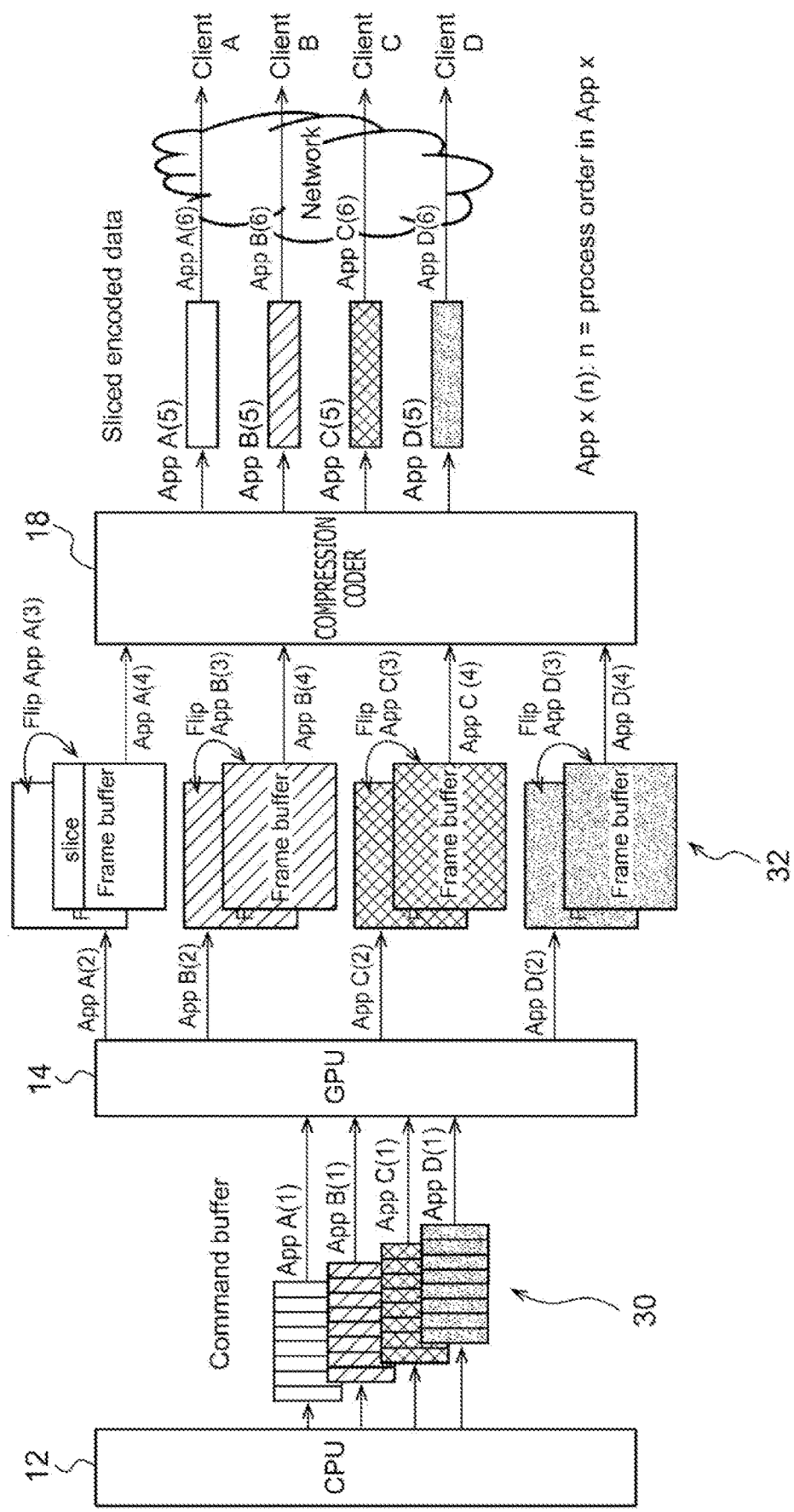
FIG. 6 is a diagram schematically illustrating parallel processing of a plurality of applications in the data processing system.

FIG. 6 schematically illustrates parallel processing of a plurality of applications in the data processing system 10. The CPU 12 performs, in parallel, data processing regarding the game AppA, the game AppB, the game AppC, and the game AppD being executed by the plurality of client apparatuses. The GPU 14 performs a process of generating a plurality of images corresponding to the plurality of game Apps executed in parallel in a time-divided manner, on the basis of an instruction from the CPU 12. As described earlier, the GPU 14 has at least a computing capability equal to the combined total of respective GPU computing capabilities required by the plurality of game Apps executed in parallel.

Specifically, the content determination section 40 of the CPU 12 determines contents of an image to be displayed by each client apparatus (e.g., image indicating manipulation results) on the basis of users' manipulation information input from the plurality of client apparatuses. In other words, the content determination section 40 determines contents of a plurality of images (e.g., image patterns and coordinate information) corresponding to the game AppA, the game AppB, the game AppC, and the game AppD.

The drawing instruction section 42 of the CPU 12 stores, in the command buffer 30 (individual App command buffers corresponding to the respective game Apps in the working example), commands for causing the contents of the respective game Apps determined by the content determination section 40 to be drawn.

The command read-out section 50 of the GPU 14 corresponds to the CP illustrated in FIG. 2. The command read-out section 50 reads out a command instructing the drawing of an image corresponding to, among the plurality of game Apps executed in parallel, a game App to be processed at a certain point in time (e.g., game AppA, and referred to as a "target App" here) from the individual App command buffer corresponding to the target App. In the case where the command read-out section 50 of the GPU 14 receives an application switching instruction (context switch instruction in the working example) from the switching instruction section 44 of the CPU 12 and the application to be executed is to be switched, the command read-out section 50 switches the command buffer from which to read out a drawing instruction from the individual App command buffer corresponding to the application that has been executed up to then to the individual App command buffer corresponding to the application to be executed next.

The image generation section 52 of the GPU 14 corresponds to the SE, the TU, and the RB illustrated in FIG. 2. The image generation section 52 generates a plurality of images corresponding to the plurality of game Apps executed in parallel and stores the plurality of images in the frame buffer 32. Specifically, the image generation section 52 generates image data of the target App in accordance with the command read out by the command read-out section 50. The image generation section 52 stores the generated image data of the target App in the individual App frame buffer corresponding to the target App. As described earlier, the image generation section 52 generates a plurality of images corresponding to the plurality of game Apps at a frame rate equal to the combined total of expected frame rates of the plurality of game Apps executed in parallel.

The GPU 14 may provide the following additional information regarding the images stored in the frame buffer 32 to subsequent processing sections (e.g., compression coder 18, communication section, display section). Additional information may include (1) data indicating of which application the image is, in other words, data indicating from which application the image has been generated. Also, additional information may include (2) data indicating the timing when the image is generated and may include, for example, what number the image is, a timestamp, time-of-day information, and so on. Also, additional information may include (3) data indicating the timing when the image is displayed and may include, for example, a timestamp, time-of-day information, and so on. This makes it possible to assist in ensuring that assignment of priorities, determination as to skipping of processes, and so on are performed properly in image processing performed by the subsequent processing sections. It should be noted that the GPU 14 may store additional information in the frame buffer 32 as metadata of the image or hand over additional information to the subsequent processing sections via a memory area which is different from the frame buffer 32.

Figure 7:
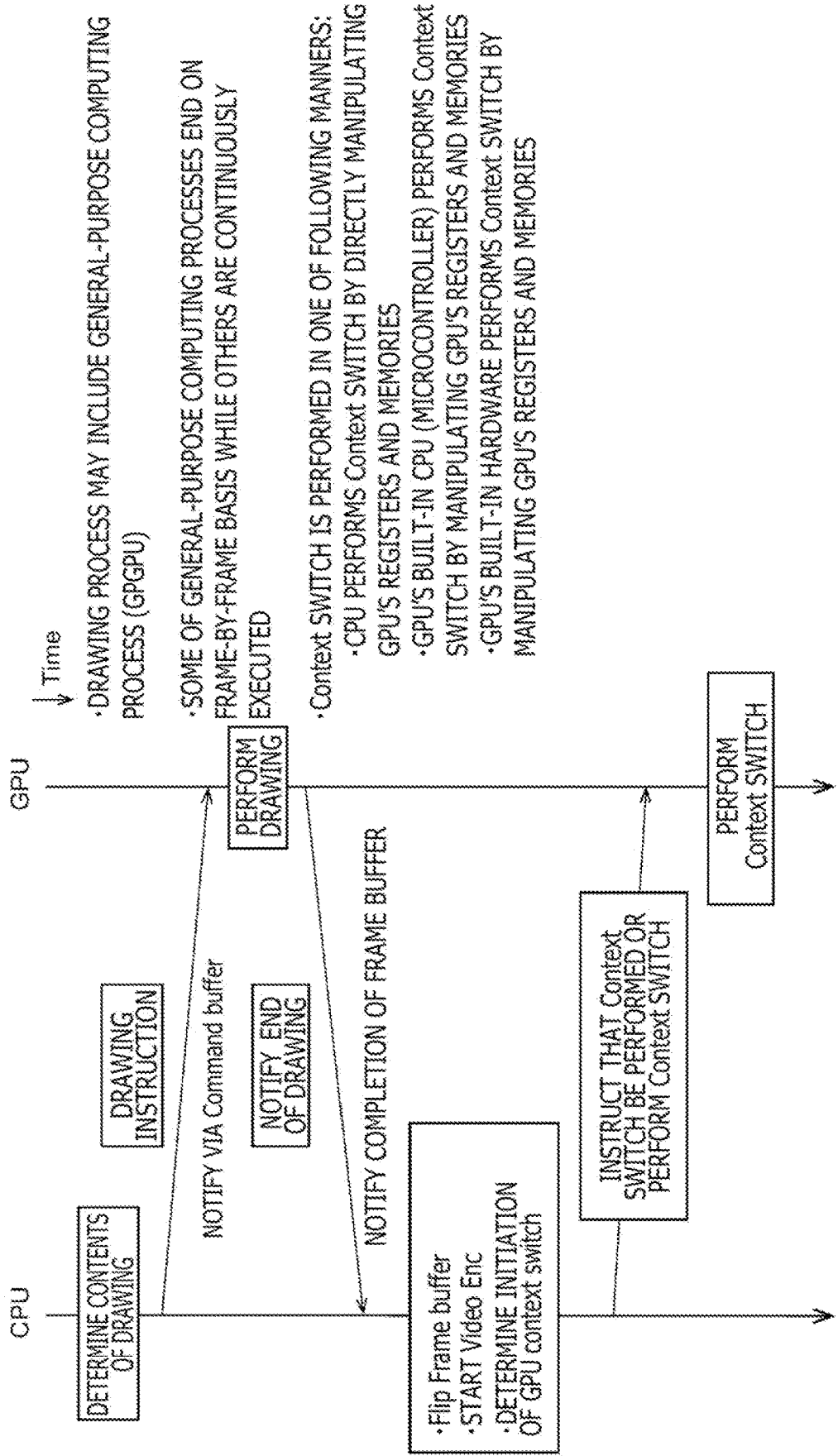
FIG. 7 is a diagram illustrating a handshake flow between a CPU and a GPU in processing of an application.

FIG. 7 is a diagram illustrating a handshake flow between the CPU and the GPU in the processing of an application. As illustrated in FIG. 7, when the image generation process is completed, the image generation section 52 of the GPU 14 sends a signal to the CPU 12 to notify that the drawing has ended. In the working example, the image generation section 52 generates an image (in other words, a frame) of the target App and stores the image in the frame buffer 32. When the storage ends, the image generation section 52 sends a signal to the CPU 12 to notify that the drawing has ended.

In the case where the GPU 14 completes all processes required to create a frame corresponding to a first application (e.g., game AppA), the switching instruction section 44 of the CPU 12 instructs the GPU 14 to switch to a process of generating an image corresponding to a second application (e.g., game AppB) different from the first application. The case where all processes required to create a frame corresponding to the first application (e.g., game AppA) are completed can be said to be the case where the process of generating an image corresponding to the first application (e.g., game AppA) which is an image to be stored in the frame buffer (can also be said to be a final image) is completed. Specifically, in the case where a drawing end notice is received from the GPU 14, the switching instruction section 44 sends a context switch instruction signal to the GPU 14. The context switch instruction may include information specifying a new target App different from the target App up to then.

When a context switch instruction is received from the CPU 12, the context storage section 54 of the GPU 14 stores context data of the target App up to then in the memory 16 or a predetermined evacuation register. As described earlier, context data includes internal state information and intermediate data from the drawing process of the target App up to then.

Also, when a context switch instruction is received from the CPU 12, the context read-out section 56 of the GPU 14 acquires context data of the new target App specified by the context switch instruction from the memory 16 or the predetermined evacuation register and sets the acquired context data in a drawing processing register of the GPU 14. When the context switch is completed, the command read-out section 50 of the GPU 14 reads out a command instructing that an image corresponding to the new target App be drawn from the individual App command buffer corresponding to the new target App and moves on to a process of generating the image corresponding to the new target App.

The time keeping section 45 of the CPU 12 measures the duration of occupation of the GPU 14 by each of the plurality of game Apps executed in parallel. In other words, the time keeping section 45 measures the time period required by each of the plurality of game Apps to perform the image generation process.

The image read-in section 60 of the compression coder 18 reads in image data from the frame buffer 32 (from the plurality of individual App frame buffers in sequence in the working example) in response to reception of a flip instruction signal, which will be described later, from the CPU 12. The compression coding section 62 compresses and codes the image data read in by the image read-in section 60 in accordance with a predetermined algorithm. When the compression coding of certain image data is completed, the compression coding section 62 hands over the compressed and coded image data to the network interface 20 for transmission to the client apparatuses.

The switching instruction section 44 of the CPU 12 of the working example sends, in response to the reception of the drawing end notice from the GPU 14 as a trigger, a flip instruction signal to the compression coder 18 and sends, at the same time, a context switch instruction to the GPU 14. The flip instruction signal is a signal that instructs that the target for which to write out-image data and the target in which to refer to image data (target to be read out for compression coding) be switched among the plurality of frame buffers 32. In other words, the flip instruction signal is a signal instructing the compression coder 18 to perform compression coding of the image stored in the frame buffer 32. The flip instruction signal may include information specifying an area of the frame buffer 32 where the image subject to compression coding is stored (specific individual App frame buffer in the working example).

Figure 8:
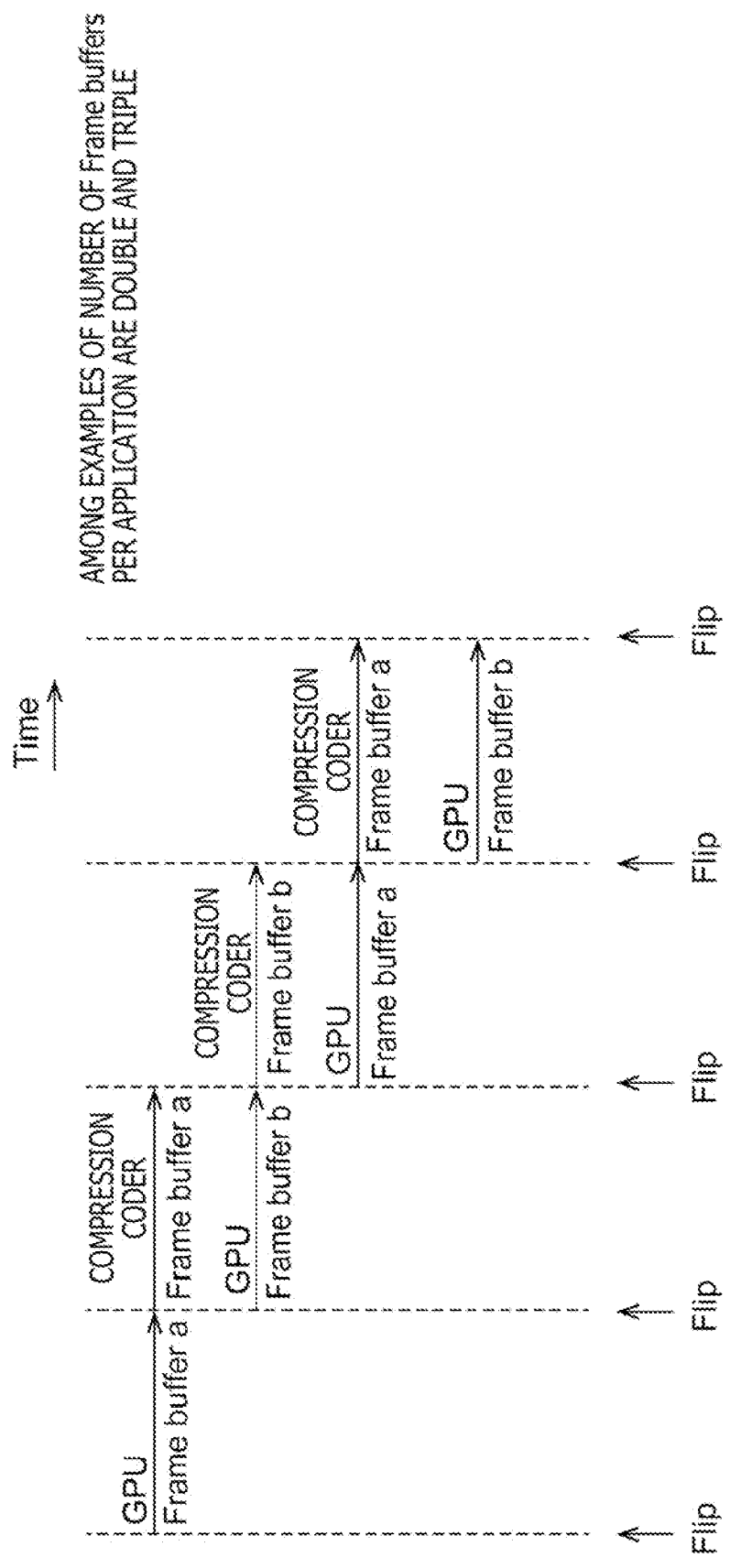
FIG. 8 is a diagram illustrating switching timings between frame buffers in processing of an application.

FIG. 8 illustrates switching timings between frame buffers in the processing of an application. This figure illustrates an example of a double buffer (referred to as "buffer 'a' and buffer 'b'" here). While the GPU 14 writes an image to the buffer 'a', the compression coder 18 reads out an image stored in the buffer 'b' for compression coding. Also, while the GPU 14 writes an image to the buffer 'b', the compression coder 18 reads out an image stored in the buffer 'a' for compression coding. This switching is carried out in response to a flip instruction signal.

In the data processing system 10, the CPU 12 shifts, for the plurality of applications to be executed in parallel, the timing when the drawing process of each application is kicked off in the GPU 14 in such a manner as to secure a predetermined GPU time period assigned to each application. As a result, the image generation section 52 of the GPU 14 generates a plurality of images corresponding to the plurality of applications to be executed in parallel, at different timings for each application, and stores the images in the individual App frame buffers each of which corresponds to one of the applications.

Also, in the data processing system 10, the compression coder 18 reads out a plurality of images corresponding to the plurality of applications from the individual App frame buffers each of which corresponds to one of the applications at different timings for each application on the basis of a flip instruction signal sent from the CPU 12. This makes it possible to reduce the processing time period from the drawing to the transmission of compressed data, in other words, reduce the delay.

Still further, in the data processing system 10, the compression coder 18 reads out a plurality of images corresponding to the plurality of applications from the frame buffers 32 at different timings for each application and performs coding of the images corresponding to the respective applications as sequential processing. This makes it possible to reduce processing performance required of the compression coder 18.

FIG. 9 illustrates an example of sharing the GPU 14 in a time-divided manner. In FIG. 9A, four systems run in parallel and generate (or display) respective images of the game AppA, the game AppB, the game AppC, and the game AppD. In FIG. 9B, a single system processes the game AppA, the game AppB, the game AppC, and the game AppD in parallel in a time-divided manner. The system in FIG. 9B is four times higher in performance than one of the systems in FIG. 9A. A time period required for the system in FIG. 9B to process each game App is one fourth (i.e., $\frac{1}{240}$ second) that of one of the systems in FIG. 9A.

FIG. 10 also illustrates examples of sharing the GPU 14 in a time-divided manner. FIG. 10A illustrates an ideal case, and a GPU occupation time period (sum of image generation time period and context switch time period) of each of the game AppA to the game AppD fits into $\frac{1}{240}$ second. In FIG. 10B, on the other hand, the GPU occupation time period of the game AppB exceeds $\frac{1}{240}$ second.

In the case of the situation illustrated in FIG. 10B, the data processing system 10 of the working example skips the next GPU assignment to the game AppB. That is, in the case where a GPU occupation time period required to generate an image corresponding to a certain application exceeds a predetermined assigned time period, the GPU assignment to the next process of generating an image corresponding to the application is skipped.

For example, the time keeping section 45 of the CPU 12 measures the time period from issuance of an instruction to the GPU 14 to perform drawing for a specific game App to reception of a drawing end notice from the GPU 14 or the time period to issuance of an instruction to perform drawing for a next game App, as a GPU occupation time period by the specific game App. In the case where the GPU occupation time period by the specific game App exceeds the predetermined time period (e.g., $\frac{1}{240}$ second in the example of FIG. 10), the drawing instruction section 42 of the CPU 12 skips a drawing instruction for the specific game App once (skips the next instruction).

As a modification example, in the case where the GPU occupation time period required to generate an image corresponding to a certain application exceeds the predetermined assigned time period, the data processing system 10 may reduce the GPU time period assigned next to the next process of generating an image corresponding to the application. For example, in the case where the GPU occupation time period by a specific game App measured by the time keeping section 45 exceeds the predetermined time period ($\frac{1}{240}$ second in the example of FIG. 10), the drawing instruction section 42 of the CPU 12 may reduce the GPU occupation time period assigned next to the specific game App to less than the time period assigned up to then. Also, the GPU occupation time period assigned next to the specific game App may be reduced to less than a normal assigned time period ($\frac{1}{240}$ second in the example of FIG. 10) which is determined by the number of Apps executed in parallel and the frame rates of the respective Apps. Also, the GPU occupation time period assigned next to the specific game App may be reduced to less than the GPU occupation time period assigned to other game Apps.

It should be noted that the process of skipping the next GPU assignment to the game App that has occupied the GPU 14 for a long time period or the process of reducing the GPU time period assigned next may be performed autonomously by the GPU 14. In this case, the GPU 14 may, in place of the CPU 12, include the time keeping section 45 that measures the GPU occupation time period of each game App.

Figure 11:
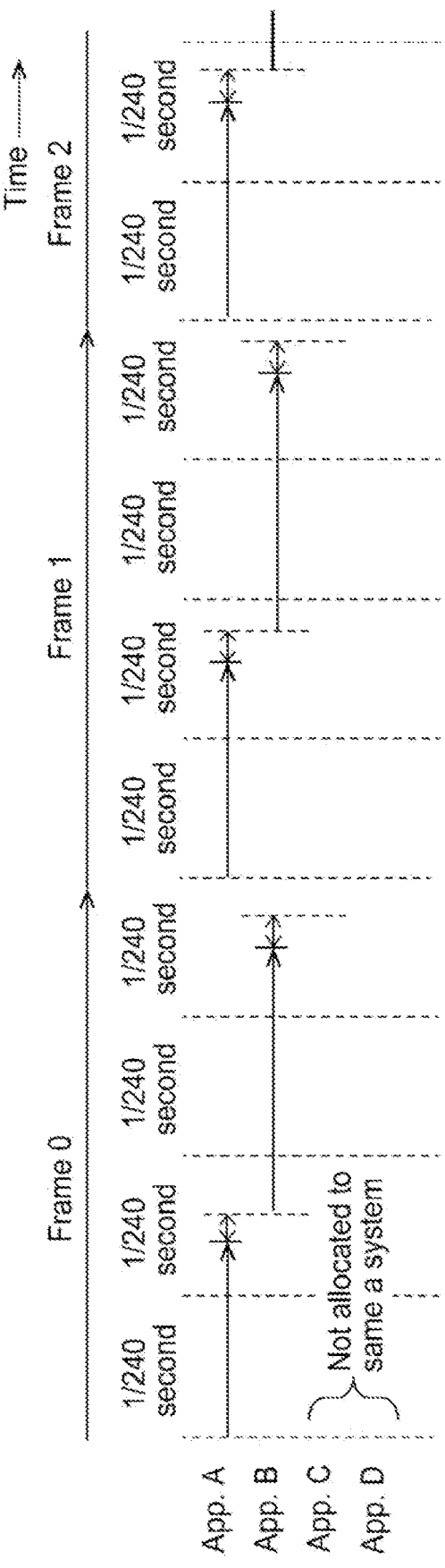
FIG. 11 is a diagram illustrating an example of sharing a GPU in a time-divided manner.

FIG. 11 also illustrates an example of sharing the GPU 14 in a time-divided manner. The CPU 12 may further include an App assignment section (not illustrated). The time keeping section 45 of the CPU 12 measures the GPU occupation time period of each of the plurality of game Apps that share the GPU 14 in a time-divided manner. In the case where the GPU occupation time periods of a predetermined number or more of game Apps among the plurality of game Apps sharing the GPU 14 in a time-divided manner exceed the predetermined time period (e.g., $\frac{1}{240}$ second), the App assignment section may reduce the number of game Apps sharing the GPU 14 (in other words, the number of game Apps processed in parallel by the data processing system 10).

FIG. 11 illustrates an example in which the game AppC and the game AppD are excluded from the game Apps that share the GPU 14 because the GPU occupation time period of the game AppA and the GPU occupation time period of the game AppB exceed the predetermined time period (e.g., $\frac{1}{240}$ second). That is, as illustrated in FIG. 11, in the case where four game Apps are executed in parallel and if the number of game Apps whose GPU occupation time periods exceed the predetermined time period reaches two, the number of game Apps executed in parallel may be reduced to two. The number of game Apps whose GPU occupation time periods exceed the predetermined time period, as a threshold for reducing the number of game Apps executed in parallel, and the number by which to reduce the number of game Apps in the case where the threshold is exceeded may be determined experimentally by using the data processing system 10.

It should be noted that, in the case where the number of game Apps executed in parallel in the own system is reduced, the App assignment section of the CPU 12 may coordinate with an App assignment section of another data processing system 10 to reassign the processing of at least one of the game Apps executed in parallel in the own system to the other data processing system 10. For example, in the case where the GPU occupation time periods of a predetermined number or more of applications among the plurality of applications executed in parallel in the own system exceed the predetermined time period (e.g., 1/240 second), the App assignment section of the CPU 12 may reassign at least one of the plurality of applications to another data processing system.

Specifically, in the case where the processing time period (GPU occupation time period) of a certain application exceeds the predetermined time period in a microscopic unit of time, i.e., an extremely small unit of time such as 1/240 second, the data processing system 10 skips the next GPU assignment to the application (Skipping App B Process in FIG. 10). Meanwhile, in the case where an impermissible excess (e.g., excess beyond a predetermined time period or count) occurs after statistics of assignment results within the time period concerned have been taken in a macroscopic unit of time, i.e., a sufficiently long unit of time such as 10 seconds, the data processing system 10 reassigns some of the plurality of applications executed in parallel to another data processing system. It should be noted that the application whose excess in time or count is large may be preferentially selected as the application to be reassigned to another data processing system.

Here, the application to be reassigned will be referred to as a target App, the data processing system 10 that has been executing the target App up to then will be referred to as a first system, and the data processing system 10 to which the target App will be reassigned will be referred to as a second system. The App assignment section of the CPU 12 of the first system may coordinate with the App assignment section of the CPU 12 of the second system to perform the following processing tasks (1) to (4) listed below.

(1) The App assignment section of the CPU 12 of the first system notifies identification information of the target App to the App assignment section of the CPU 12 of the second system. The processing sections (e.g., CPU 12, GPU 14) on the second system side load the program of the target App from the memory 16 on the basis of the identification information of the target App and starts the target App.

(2) The App assignment section of the CPU 12 of the first system sends context data regarding the target App stored in the first system to the second system, and the App assignment section of the CPU 12 of the second system sets the context data in the processing sections (e.g., CPU 12, GPU 14).

(3) The target App runs on both of the first and second systems until a context switch of the target App is performed in the first system at a certain timing after the completion of the above task (1). The App assignment section of the CPU 12 of the first system halts the execution of the target App in the first system in response to the context switch at the above certain timing as a trigger and notifies the App assignment section of the CPU 12 of the second system to that effect. The App assignment section of the CPU 12 of the first system sends, to the second system, context data of the target App of the first system stored by the context switch at the above certain timing, and the App assignment section of the CPU 12 of the second system sets the context data in the processing sections (e.g., CPU 12, GPU 14).

(4) When the halting of execution of the target App in the first system is notified and the setting of context data of the target App is completed, the App assignment section of the CPU 12 of the second system starts the execution of the target App by each of the processing sections of the second system. It should be noted that the context setting and the start of execution of the target App in the second system are desirably performed within an assigned processing time interval (in 1/60 second in the present example) from the final context switch of the target App in the first system.

The certain timing in the above task (3) may be selected in anticipation that the storage of the contexts of the first system, the transfer of the contexts from the first system to the second system, and the setting of the contexts in the second system will be completed within the assigned processing time interval. For example, the certain timing may be determined after making a decision as to whether or not a transfer unit provided between the first and second systems is occupied by other processing and so on.

As a result, the second system resumes the execution of the target App, after having taken over the latest context of the target App of the first system, with no time lag and without the user recognizing the transition of the running system.

Copying of the contexts from the first system to the second system and setting thereof may be repeated until the above certain timing arrives. For example, in the case where the transfer, setting, and resumption of processing of all the contexts cannot be completed within the single assigned processing time interval because of a large amount of context data, the transfer, setting, and resumption of processing may be performed on a plurality of separate occasions. Also, in the case where, despite the anticipation that the storage of the contexts of the first system, the transfer of the contexts from the first system to the second system, and the setting of the contexts in the second system would be completed within the assigned processing time interval, the storage, transfer, and setting of the contexts cannot be actually completed in time, the execution of the application by the first system may be continued, and the copying and setting of the contexts may be performed again later.

Also, the data processing system 10 is configured such that the compression coder 18 reads out a plurality of images corresponding to a plurality of applications from the frame buffers 32 at different timings for each application. In the present working example, the drawing instruction section 42 of the CPU 12 writes commands instructing drawing to the command buffers 30 at different timings for each of the applications executed in parallel. As a result, the GPU 14 generates images at different timings for each of the applications executed in parallel and writes images to the frame buffers 32 (individual App frame buffers) at different timings for each of the applications executed in parallel. Also, the switching instruction section 44 of the CPU 12 notifies a flip instruction to the compression coder 18 at different timings for each of the applications executed in parallel.

FIG. 12 illustrates operation of the compression coder 18 in the case where the plurality of applications are processed in parallel. This figure includes a timing chart illustrating timings when the compression coder 18 reads in an image from the frame buffer 32 (Scan) and timings when the compression coder 18 compresses and codes the read image (Enc).

In the working example, the switching instruction section 44 of the CPU 12 sends a flip instruction signal to the compression coder 18 at different timings for each game App. As a result, as illustrated in FIG. 4 (scheme 72) and in FIG. 12, the image read-in section 60 of the compression coder 18 reads out a plurality of images corresponding to a plurality of game Apps from the frame buffers 32 (specifically, individual App frame buffers corresponding to the game Apps to be processed) at different timings for each game App.

Also, as illustrated in FIG. 4 (scheme 72) and in FIG. 12, the compression coding section 62 of the compression coder 18 compresses and codes the plurality of images corresponding to the plurality of game Apps at different timings for each game App. The compression coding section 62 performs a process of compressing and coding the plurality of images corresponding to the plurality of game Apps as sequential processing. Also, as described earlier, the compression coding section 62 has performance capable of coding images at a frame rate equal to the combined total of expected frame rates of the plurality of game Apps executed in parallel.

The compression coding section 62 of the compression coder 18 stores a past image of each of the plurality of game Apps executed in parallel in a predetermined storage area in such a manner that the past images are distinguished from each other for each game App. In other words, the compression coding section 62 stores a past image corresponding to a game App in a predetermined storage area in such a manner that the past image is distinguished from an image corresponding to another game App. When compressing and coding a new image corresponding to a specific game App, the compression coding section 62 refers to the past image corresponding to the game App stored in the above storage area. As a result, the efficiency with which the respective images of the plurality of game Apps executed in parallel are compressed is enhanced.

A description will be given below of an example of CPU and GPU assignment.

Systems B in FIG. 1 each include eight CPUs each of which is capable of processing one thread by running at 1.6 GHz. Meanwhile, the system A in FIG. 1 includes eight CPUs each of which is capable of processing two threads by running at 3.2 GHz. Accordingly, the system A has CPU performance substantially four times as high as that of the system B. The CPUs of the system A capable of processing two threads refer to the fact that the CPU hardware has a mechanism to support processing of threads and that a single CPU can execute two applications at the same time.

Figure 13:
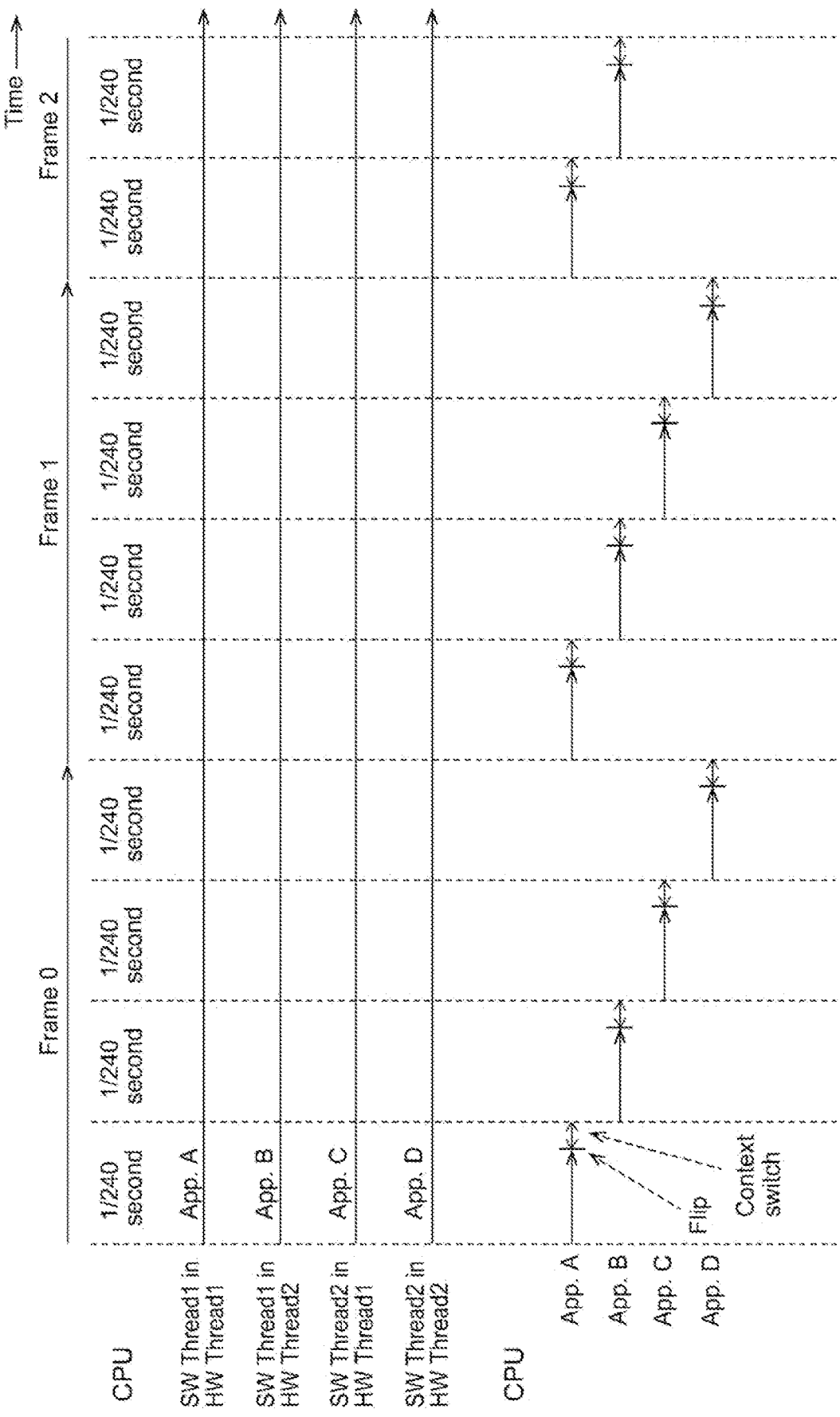
FIG. 13 is a diagram illustrating an example of assigning the CPU and the GPU in a time-divided manner in a system A illustrated in FIG. 1.
Figure 14:
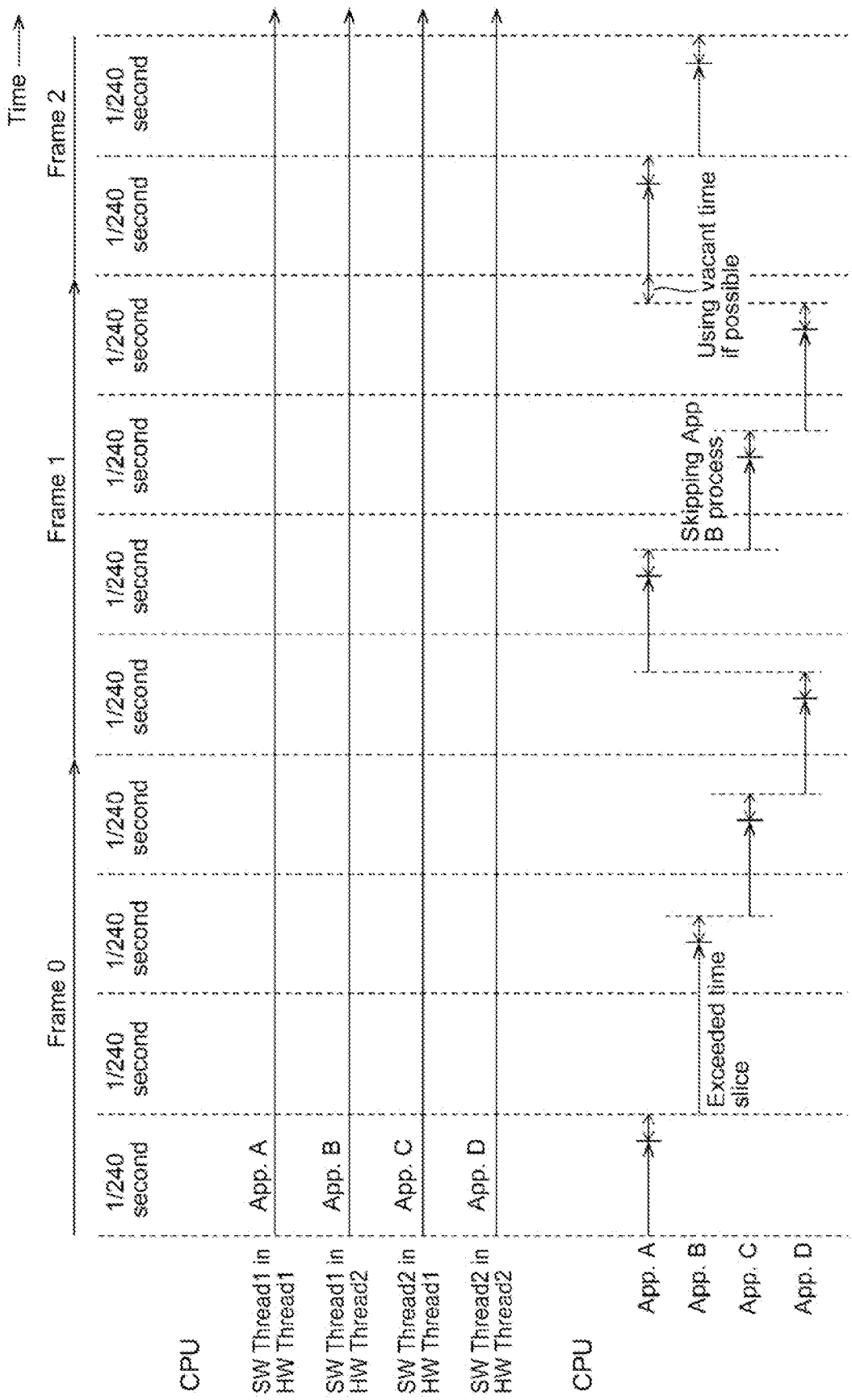
FIG. 14 is a diagram illustrating an example of assigning the CPU and the GPU in a time-divided manner in the system A illustrated in FIG. 1.

FIGS. 13 and 14 illustrate examples of assigning the CPU and GPU in a time-divided manner in the system A in FIG. 1. The four applications (AppA to AppD) executed here have been developed on the premise that eight CPUs each of which runs at 1.6 GHz are available. The applications are executed by assigning each application to each thread of the eight CPUs. Assuming the case where two threads are supported as a piece of CPU hardware and four applications are to be executed in parallel as in the system A, the four threads are executed in parallel by providing two software-controlled threads within a single hardware thread.

Here, CPU thread processing refers to a state in which, regardless of hardware or software control, the applications are processed on the CPU in a time-divided manner at a granularity far smaller than the predetermined time period assigned to the GPU (e.g., 1/240 second). It is possible to create a state in which each application runs by substantially occupying the CPU concerned.

It is necessary for the application running in each CPU thread to detect a change that occurs outside the CPU in real time and take a necessary measure. In addition, for coordinating with the outside in real time similarly to the case of the system B, the applications running in the respective CPU threads continue to run in parallel on the CPU regardless of the predetermined unit of time period assigned to the GPU or the actual time periods for which the GPU is occupied by the respective applications. This makes it possible for each application running in each CPU thread to run synchronously with processing of each application running on the GPU with no delay.

As illustrated in FIGS. 13 and 14, CPU occupation is assigned regardless of the predetermined time period assigned to the GPU when the CPU is assigned to each application. That is, the CPU 12 of the data processing system 10 executes the plurality of applications in parallel, regardless of the time period assigned to each application in the GPU 14, in such a manner that resources of the CPU 12 are occupied in parallel by the respective applications. This makes it possible for the applications on the CPU 12 to perform synchronous processing with the outside of the CPU 12 including the GPU 14 while at the same time maintaining realtimeness.

Also, in the case where the number of CPUs is insufficient for the number of applications to be executed in parallel as illustrated in the system A in FIG. 1 and FIGS. 13 and 14, the CPU executes the plurality of applications to be executed in parallel by using threads under hardware or software control.

Still further, as described earlier, GPU command buffers are made available, one for each of the applications to be executed in parallel. The CPU stores a data processing instruction (e.g., drawing instruction) regarding the plurality of applications to be executed in parallel in the command buffers corresponding to the respective applications. The GPU reads out the data processing instruction (e.g., drawing instruction) regarding the plurality of applications to be executed in parallel from the command buffers and performs data processing (e.g., drawing process) corresponding to each application. This makes it possible to continue processing of a specific application on the CPU and write an instruction which is addressed to the GPU to the command buffer corresponding to the specific application at any time, even while processing of the specific application is not assigned to the GPU (while the GPU is not occupied by the specific application).

The present invention has been described above on the basis of the working example. It is to be understood by a person skilled in the art that this working example is illustrative, that the combinations of constituent elements and processes can be modified in various ways, and that such modification examples also fall within the scope of the present invention.

A description will be given of a first modification example. The data processing system 10 may be connected to a display apparatus that displays an image generated by the data processing system 10. The switching instruction section 44 of the CPU 12 may store data indicating a blanking interval (in other words, interval during which no video image is displayed) while an image is displayed on the display apparatus. The switching instruction section 44 may send a context switch instruction to the GPU 14 and send a flip instruction signal to the compression coder 18 during a blanking interval while an image is displayed on the display apparatus. As described earlier, GPU processes are not required during a blanking interval. Accordingly, it is possible to keep an impact of a context switching process on the image generation process (e.g., delay in image processing process) to a minimum.

A description will be given of a second modification example. Although a context switch performed by the GPU 14 has been described in the above working example, a context switch may also be performed by the compression coder 18. For example, the compression coder 18 may include, as does the GPU 14, a context read-out section that reads out a context (e.g., internal state of the compression coder 18 or previously processed data) regarding a certain application from the memory 16 and setting the context in the compression coder 18 before initiating compression and coding of an image corresponding to the application. Also, the compression coder 18 may include a context storage section that saves a context regarding a certain application from the compression coder 18 to the memory 16 when compression coding of an image corresponding to the application is completed.

A description will be given of a third modification example. As proposed in the patent application (Patent Application No. 2020-016144) of the present applicant, the data processing system 10 may include at least one of a hardware functional block that is solely intended to perform a context switch of the GPU 14 and a hardware functional block that is solely intended to perform a context switch of the compression coder 18. This hardware functional block is independent of the CPU 12, the GPU 14, the memory 16, and the compression coder 18 and will be hereinafter also referred to as a "context switch engine."

The context switch engine accesses the memory 16 through DMA (Direct Memory Access). When notified of or detecting by itself an application switching timing, the context switch engine (1) selects the context of each application held on the memory 16, transfers the context to the processing sections (e.g., GPU 14, compression coder 18) without an intermediary of software, and sets the context. Alternatively, the context switch engine (2) transfers and saves the context held in the processing sections (e.g., GPU 14, compression coder 18) to the memory without an intermediary of software.

Specifically, in the case where the GPU 14 completes the process of generating an image corresponding to the first application and initiates the process of generating an image corresponding to the second application, the context switch engine that performs a context switch of the GPU 14 may detect an application switching timing on the basis of a notice from the switching instruction section 44 of the CPU 12, a notice from the GPU 14, a timing indicated by a video signal, or the like. Then, the context switch engine may save the context regarding the first application from the GPU 14 to the memory 16 and set the context regarding the second application from the memory 16 to the GPU 14 without an intermediary of processing of software that manages the plurality of applications executed in parallel.

Also, in the case where the compression coder 18 completes the coding of an image corresponding to the first application and initiates the coding of an image corresponding to the second application, the context switch engine that performs a context switch of the compression coder 18 may detect an application switching timing on the basis of a notice from the switching instruction section 44 of the CPU 12, a notice from the compression coder 18, a timing indicated by a video signal, or the like. Then, the context switch engine may save the context regarding the first application from the compression coder 18 to the memory 16 and set the context regarding the second application from the memory 16 to the compression coder 18 without an intermediary of processing of software that manages the plurality of applications executed in parallel. Software that manages the plurality of applications is typically software executed by the CPU 12 and may be, for example, software that manages an order of execution of the applications or resource allocation.

Figure 15:
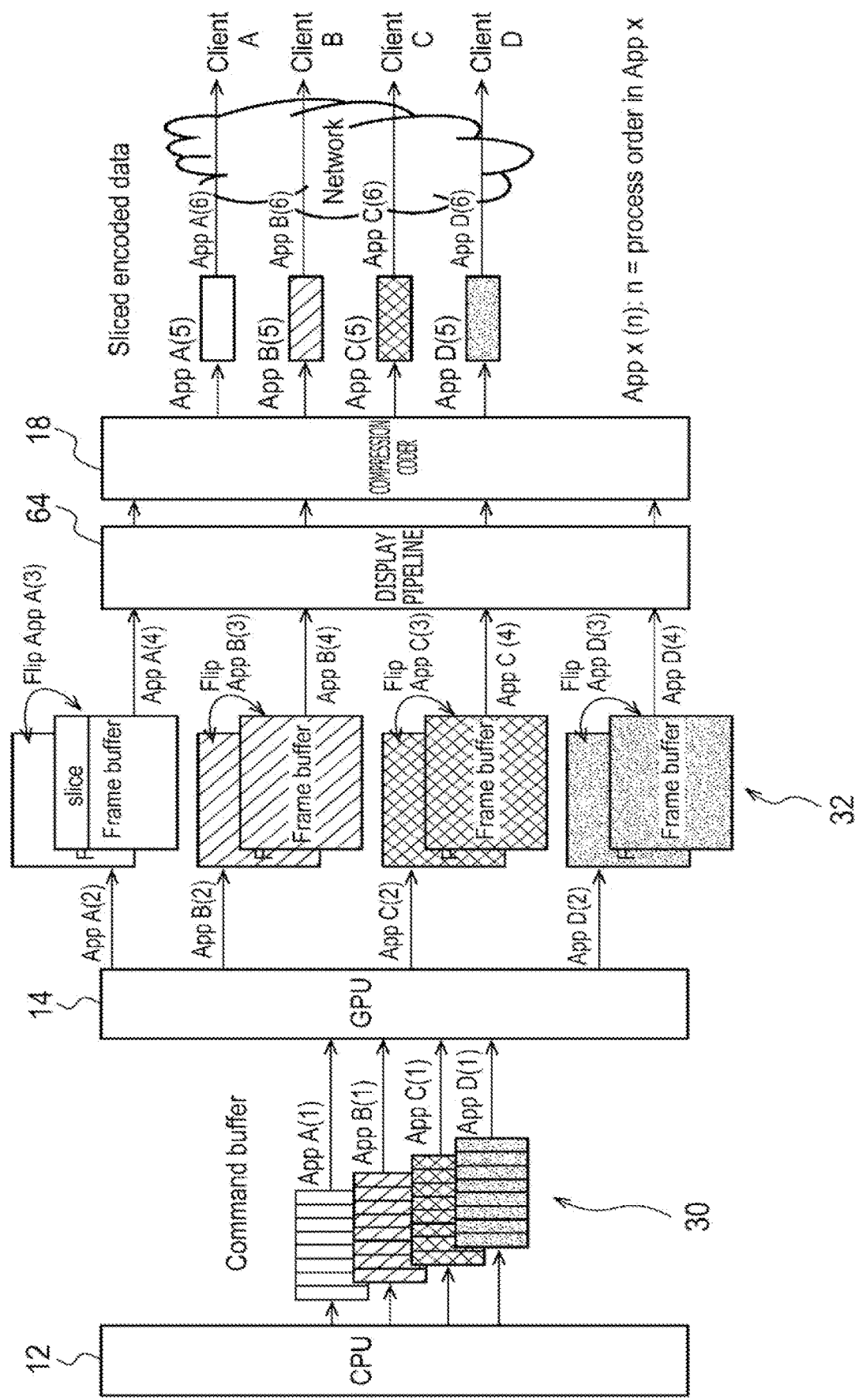
FIG. 15 is a diagram schematically illustrating parallel processing of a plurality of applications in a data processing system of a modification example.
Figure 16:
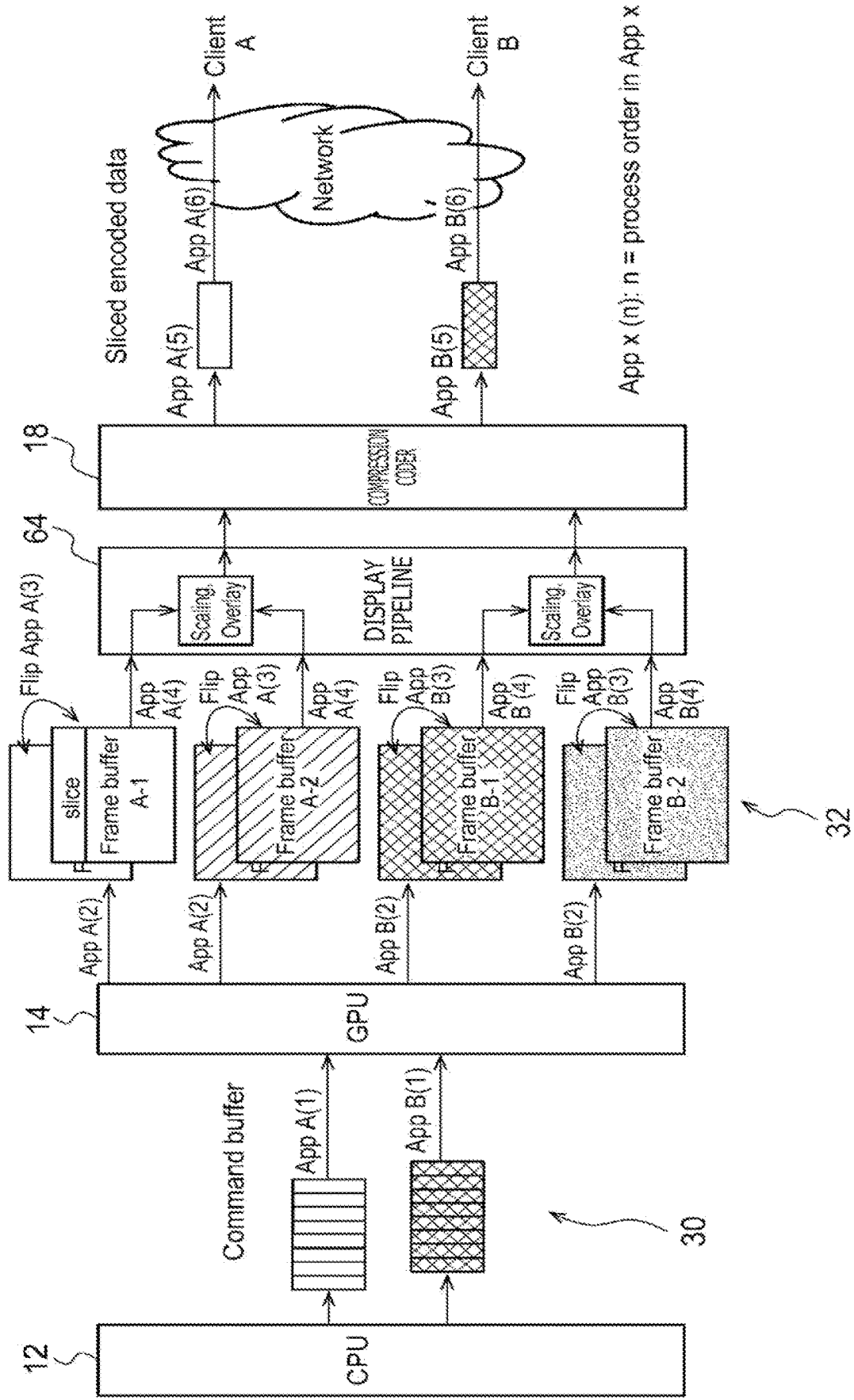
FIG. 16 is a diagram schematically illustrating parallel processing of a plurality of applications in the data processing system of the modification example.

A description will be given of a fourth modification example. FIGS. 15 and 16 schematically illustrate parallel processing of a plurality of applications in the data processing system 10 of the modification example. The data processing system 10 may have a display pipeline 64 (in other words, video pipeline) between the GPU 14 and the compression coder 18.

The display pipeline 64 may perform, in a time-divided manner, resolution conversion, image quality conversion, or multiplexing of images supplied from other block (e.g., GPU 14 or video decoder which is not illustrated) which is a supplier of the images, in other words, images of the plurality of applications to be processed in parallel.

In FIG. 16, (1) the GPU 14 performs the drawing processes of the two applications (AppA and AppB) in a time-divided manner, generates two final images for each application, and stores the images in the frame buffers 32. (2) The display pipeline 64 scales and merges the two final images for each application. (3) The compression coder 18 compresses and codes the images that have been scaled and merged for each application.

A description will be given of a fifth modification example. Although the switching instruction section 44 is provided in the CPU 12 in the above working example, the switching instruction section 44 may be provided in a functional block other than the CPU 12 (e.g., GPU 14).

The technical ideas described in the working example are also applicable to cases other than that where a plurality of game Apps are executed in parallel. For example, the technical ideas are also applicable to a case where other types of applications (e.g., office software or business system programs) are executed in parallel in place of or together with game Apps.

Any combination of the above working example and modification examples is also effective as an embodiment of the present disclosure. A new embodiment arising out of the combination has advantageous effects of the working example and the modification examples combined. It is also to be understood by a person skilled in the art that the function to be delivered by each of the components recited in the claims is realized by each of constituent elements indicated in the working example and modification examples alone or in coordination with each other.

The technology described in the working example and the modification examples may be identified by the following modes:

[Feature 1-1] A data processing system including:
  a GPU adapted to perform in a time-divided manner a process of generating a plurality of pieces of data corresponding to a plurality of applications executed in parallel; and
  an instruction section adapted, in the case where the GPU completes a process of generating one unit of data that is data corresponding to a first application and that is to be handed over to subsequent processing sections, to instruct the GPU to switch to a process of generating data corresponding to a second application different from the first application.

According to this data processing system, it is possible to efficiently realize switching to a process of generating data corresponding to the second application because the amount of data regarding the first application which needs to be saved decreases immediately after the completion of a process of generating one unit of data corresponding to the first application. That is, it is possible to efficiently realize a process of generating a plurality of pieces of data corresponding to a plurality of applications while at the same time reducing the number of hardware resources and improving a system availability rate by performing, with a single GPU, the process of generating the plurality of pieces of data corresponding to the plurality of applications.

[Feature 1-2] The data processing system of feature 1-1, in which the one unit of data that is to be handed over to the subsequent processing sections is an image.

According to this data processing system, it is possible to efficiently realize switching to a process of generating an image corresponding to the second application because the amount of data regarding the first application which needs to be saved decreases immediately after the completion of the process of generating an image corresponding to the first application.

[Feature 1-3] The data processing system of feature 1-1 or 1-2, in which, in the case where the process of generating the one unit of data corresponding to the first application is completed in the GPU, context data regarding the first application is stored in a predetermined storage area.

According to this data processing system, it is possible to reduce the amount of context data regarding the first application which needs to be saved and realize an efficient context switch. In other words, by performing a context switch after the completion of drawing by the GPU, it becomes easy to interrupt and switch processing in the GPU, thus reducing a processing volume for the context switch.

[Feature 1-4] The data processing system of claim 1 or 2, further including:
  a transfer section adapted, in the case where the GPU completes the process of generating the one unit of data corresponding to the first application and initiates the process of generating data corresponding to the second application, to save context data regarding the first application from the GPU to a predetermined storage area and set context data regarding the second application from the storage area to the GPU, without an intermediary of processing of software that manages the plurality of applications.

According to this data processing system, an advantageous effect of completing a context switch even more quickly is achieved in addition to an advantageous effect similar to that of feature 1-3.

[Feature 1-5] The data processing system of any one of features 1-1 to 1-4, in which, in the case where a GPU occupation time period required for the process of generating the one unit of data corresponding to the first application exceeds a predetermined assigned time period, a time period assigned to the next process of generating the one unit of data corresponding to the first application is reduced, or GPU assignment to the next generation process is skipped.

According to this data processing system, it is possible to reduce an impact (e.g., delay) of an excess in the GPU occupation time period of the first application on data processing of other applications in the GPU and maintain fairness between the applications executed in parallel. That is, even if a context switch is not performed every predetermined assigned time period at a microscopic level such as $1/240$ second, each application is executed at a ratio appropriate to the predetermined assigned time period at a macroscopic level such as several seconds to several minutes. As a result, it is possible to ensure that behavior of each application in the data processing system, including real-timeness of processing, is the same as in the case where the applications are executed by the individual systems as in the systems B in FIG. 1.

[Feature 1-6] The data processing system of any one of features 1-1 to 1-5, in which, in the case where GPU occupation time periods of a predetermined number or more of applications among the plurality of applications exceed a predetermined assigned time period, the number of applications for which the one unit of data is generated by the GPU is reduced.

According to this data processing system, it is possible to secure a GPU occupation time period required for the application data generation process.

[Feature 1-7] The data processing system of any one of features 1-1 to 1-5, in which, in the case where GPU occupation time periods of a predetermined number or more of applications among the plurality of applications exceed a predetermined assigned time period, at least one of the plurality of applications is assigned to another data processing system.

According to this data processing system, it is possible to secure a GPU occupation time period required for the application data generation process.

[Feature 1-8] The data processing system of feature 1-7, in which, in the case where the at least one application is assigned to the other data processing system, (1) the application is started in the other data processing system, (2) context data regarding the application stored in the own system is sent to the other data processing system, and (3) processing of the application in the own system is halted in response to a context switch at a certain timing of the application in the own system as a trigger.

According to this data processing system, it is possible to cause another system to suitably take over processing of an application being executed in the own system.

[Feature 1-9] The data processing system of any one of features 1-1 to 1-8, further including:
  a coding section, in which
    the GPU generates an image as the one unit of data and stores the generated image in a frame buffer, and,
    when instructing the coding section to code the image stored in the frame buffer, the instruction section instructs the GPU to perform the switching.

According to this data processing system, it is possible, when a process of generating one unit of data corresponding to one application is completed, to reliably instruct that switching be performed to a process of generating data corresponding to another application.

[Feature 1-10] The data processing system of feature 1-9, in which the GPU provides, to subsequent processing sections, at least one of the following pieces of data regarding the image stored in the frame buffer: (1) data indicating of which application the image is, (2) data indicating when the image is generated, and (3) data indicating when the image is displayed.

According to this data processing system, it is possible to properly operate the subsequent processing sections (e.g., compression coding/decompression section, communication section, display section).

[Feature 1-11] The data processing system of any one of features 1-1 to 1-10, in which the instruction section instructs that the switching be performed during a blanking interval while an image is displayed.

According to this data processing system, GPU processes are not required during a blanking interval. Accordingly, it is possible to avoid an impact of a context switching process on the image generation process (e.g., delay in image processing process).

[Feature 1-12] The data processing system of any one of features 1-1 to 1-11, in which the GPU has at least a computing capability equal to a combined total of respective GPU computing capabilities required by the plurality of applications.

According to this data processing system, it is possible to keep a delay in generating a plurality of pieces of data corresponding to a plurality of applications to a minimum. For example, in the case where data generated by the GPU is an image, it is possible to keep a delay in displaying a plurality of images corresponding to a plurality of applications to a minimum.

[Feature 1-13] The data processing system of any one of features 1-1 to 1-12, further including:
a CPU adapted to execute the plurality of applications in parallel, in which
the CPU has at least a computing capability equal to a combined total of respective CPU computing capabilities required by the plurality of applications.

According to this data processing system, it is possible to keep a delay in processing a plurality of applications executed in parallel to a minimum.

[Feature 1-14] The data processing system of feature 1-13, in which the CPU executes the plurality of applications in parallel, regardless of a time period assigned to each application in the GPU, in such a manner that resources of the CPU are occupied in parallel by the respective applications.

According to this data processing system, it is possible for the CPU to perform synchronous processing with external functional blocks including the GPU while at the same time maintaining realtimeness.

[Feature 1-15] The data processing system of feature 1-14, further including:
command buffers corresponding to the plurality of applications, in which
the CPU stores a data processing instruction regarding the plurality of applications in the command buffers corresponding to the respective applications, and
the GPU reads out the data processing instruction regarding the plurality of applications from the command buffers.

According to this data processing system, it is possible to continue processing of a specific application on the CPU even while processing of the specific application is not assigned to the GPU.

[Feature 1-16] The data processing system of any one of features 1-1 to 1-12, further including:
a plurality of command buffers corresponding to the plurality of applications and adapted to store a data processing instruction regarding the plurality of applications, in which,
in the case where the application to be executed is to be switched, the GPU switches between the command buffers from which to read out the data processing instruction.

According to this data processing system, it is possible to perform processing of a certain application in a functional block that issues a data processing instruction asynchronously with processing of the application in the GPU.

[Feature 1-17] The data processing system of feature 1-16, further including:
a command buffer different from the plurality of command buffers and adapted to store an instruction for data processing that can be performed asynchronously with switching between applications to be executed by the GPU.

According to this data processing system, it is possible to cause the GPU to perform, asynchronously with switching between applications to be executed by the GPU, data processing (e.g., general-purpose computing process such as numerical calculation) that can be performed asynchronously with the switching.

[Feature 1-18] A data processing method performed by a data processing system, the data processing system including a GPU and an instruction section, the data processing method including:
a step, performed by the GPU, of performing in a time-divided manner a process of generating a plurality of pieces of data corresponding to a plurality of applications executed in parallel; and
a step, performed by the instruction section, of instructing the GPU, in the case where the GPU completes a process of generating one unit of data that is data corresponding to a first application and that is to be handed over to subsequent processing sections, to switch to a process of generating an image corresponding to a second application different from the first application.

According to this data processing method, it is possible to efficiently realize switching to a process of generating data corresponding to the second application because the amount of data regarding the first application which needs to be saved decreases immediately after the completion of a process of generating one unit of data corresponding to the first application. That is, it is possible to efficiently realize a process of generating a plurality of pieces of data corresponding to a plurality of applications while at the same time reducing the number of hardware resources and improving a system availability rate by performing, with a single GPU, the process of generating a plurality of pieces of data corresponding to a plurality of applications.

[Feature 1-19] A computer program for causing a data processing system, the data processing system including a GPU and an instruction section, to perform:
a step, performed by the GPU, of performing in a time-divided manner a process of generating a plurality of pieces of data corresponding to a plurality of applications executed in parallel; and
a step, performed by the instruction section, of instructing the GPU, in the case where the GPU completes a process of generating one unit of data that is data corresponding to a first application and that is to be handed over to subsequent processing sections, to switch to a process of generating an image corresponding to a second application different from the first application.

According to this computer program, it is possible to efficiently realize switching to a process of generating data corresponding to the second application because the amount of data regarding the first application which needs to be saved decreases immediately after the completion of a process of generating one unit of data corresponding to the first application. That is, it is possible to efficiently realize a process of generating a plurality of pieces of data corresponding to a plurality of applications while at the same time reducing the number of hardware resources and improving a system availability rate by performing, with a single GPU, the process of generating a plurality of pieces of data corresponding to a plurality of applications.

[Feature 2-1] A data processing system including:
an image generation section adapted to generate a plurality of images corresponding to a plurality of applications executed in parallel and store the plurality of images in a frame buffer; and a coding section adapted to read out the images stored in the frame buffer and code the images, in which the coding section reads out the plurality of images corresponding to the plurality of applications from the frame buffer at different timings for each application.

According to this data processing system, it is possible to realize coding with a small delay and keep required performance of a coder to a minimum.

[Feature 2-2] The data processing system of feature 2-1, in which the coding section performs a process of coding the plurality of images corresponding to the plurality of applications as sequential processing.

According to this data processing system, it is possible to realize coding with a small delay and keep required performance of a coder to a minimum.

[Feature 2-3] The data processing system of feature 2-1 or 2-2, in which the image generation section generates the plurality of images corresponding to the plurality of applications at different timings for each application.

According to this data processing system, it is possible to reduce required performance of an image generation section (e.g., GPU).

[Feature 2-4] The data processing system of any one of features 2-1 to 2-3, further including:

a CPU, in which the CPU shifts a timing when a drawing process of each application is started by the image generation section in such a manner as to assign a predetermined time period to each application, and the coding section reads out the plurality of images corresponding to the plurality of applications from the frame buffer at different timings for each application.

According to this data processing system, it is possible to reduce required performance of an image generation section (e.g., GPU) and reduce required performance of a coding section.

[Feature 2-5] The data processing system of feature 2-1, further including:

a CPU, in which the CPU shifts a timing when a drawing process of each application is started by the image generation section in such a manner as to assign a predetermined time period to each application, and the coding section reads out the plurality of images corresponding to the plurality of applications from the frame buffer at different timings for each application and performs the process of coding the plurality of images corresponding to the plurality of applications as sequential processing.

According to this data processing system, it is possible to reduce required performance of an image generation section (e.g., GPU) and reduce required performance of a coding section.

[Feature 2-6] The data processing system of any one of features 2-1 to 2-5, in which the image generation section generates the plurality of images at a frame rate equal to a combined total of expected frame rates of the plurality of applications.

According to this data processing system, it is possible to keep a delay in generating a plurality of images corresponding to a plurality of applications to a minimum and keep a delay in displaying a plurality of images corresponding to a plurality of applications to a minimum.

[Feature 2-7] The data processing system of any one of features 2-1 to 2-6, in which the coding section has performance capable of coding images at a frame rate equal to a combined total of expected frame rates of the plurality of applications.

According to this data processing system, it is possible to keep a delay in coding a plurality of images corresponding to a plurality of applications to a minimum and keep a delay in displaying a plurality of images corresponding to a plurality of applications to a minimum.

[Feature 2-8] The data processing system of any one of features 2-1 to 2-7, in which the coding section stores a past image corresponding to a certain application in a manner distinguished from images corresponding to other applications and refers, when compressing and coding a new image corresponding to the certain application, to the past image corresponding to the application.

According to this data processing system, it is possible to increase a compression efficiency of images of a plurality of applications executed at different timings.

[Feature 2-9] The data processing system of any one of features 2-1 to 2-8, further including:

a transfer section adapted, in the case where the coding section completes coding of an image corresponding to a first application and initiates coding of an image corresponding to a second application, to save context regarding the first application from the coding section to a storage section and set context regarding the second application from the storage section to the coding section, without an intermediary of processing of software that manages the plurality of applications.

According to this data processing system, it is possible to perform a context switch in a coding section at high speed and, for example, to keep a delay in processing of the coding section to a minimum.

[Feature 2-10] A data processing method performed by a data processing system, the data processing system including an image generation section and a coding section, the data processing method including:

a step, performed by the image generation section, of generating a plurality of images corresponding to a plurality of applications executed in parallel and storing the plurality of images in a frame buffer; and a step, performed by the coding section, of reading out the plurality of images corresponding to the plurality of applications from the frame buffer at different timings for each application and coding the images that have been read out.

According to this data processing method, it is possible to realize coding with a small delay and keep required performance of a coder to a minimum.

[Feature 2-11] A computer program for causing a data processing system, the data processing system including an image generation section and a coding section, to perform:

a step, performed by the image generation section, of generating a plurality of images corresponding to a plurality of applications executed in parallel and storing the plurality of images in a frame buffer; and a step, performed by the coding section, of reading out the plurality of images corresponding to the plurality of applications from the frame buffer at different timings for each application and coding the images that have been read out.

According to this computer program, it is possible to realize coding with a small delay and keep required performance of a coder to a minimum.

INDUSTRIAL APPLICABILITY

This invention is applicable to a system that executes a plurality of applications in parallel.

REFERENCE SIGNS LIST

10 Data processing system
12 CPU
14 GPU
18 Compression coder
32 Frame buffer
42 Drawing instruction section
44 Switching instruction section
52 Image generation section
54 Context storage section
56 Context read-out section
62 Compression coding section

The invention claimed is:

1. A data processing system comprising:
a GPU adapted to perform in a time-divided manner a process of generating a plurality of pieces of data corresponding to a plurality of applications executed in parallel, the GPU being a graphics processing unit; and
an instruction section adapted, in a case where the GPU completes a process of generating one unit of data that is data corresponding to a first application and that is to be handed over to subsequent processing sections, to instruct the GPU to switch to a process of generating data corresponding to a second application different from the first application,
wherein each of the plurality of applications is a computer executable program operating to receive user inputs to facilitate manipulation of a user interactive experience.

2. The data processing system of claim 1, wherein the one unit of data that is to be handed over to the subsequent processing sections is an image.

3. The data processing system of claim 1, wherein, in a case where the process of generating the one unit of data corresponding to the first application is completed in the GPU, context data regarding the first application is stored in a predetermined storage area.

4. The data processing system of claim 1, further comprising:
a transfer section adapted, in a case where the GPU completes the process of generating the one unit of data corresponding to the first application and initiates the process of generating data corresponding to the second application, to save context data regarding the first application from the GPU to a predetermined storage area and set context data regarding the second application from the storage area to the GPU, without an intermediary of processing of software that manages the plurality of applications.

5. The data processing system of claim 1, wherein, in a case where a GPU occupation time period required for the process of generating the one unit of data corresponding to the first application exceeds a predetermined assigned time period, a time period assigned to a next process of generating the one unit of data corresponding to the first application is reduced, or GPU assignment to the next generation process is skipped.

6. The data processing system of claim 1, wherein, in a case where GPU occupation time periods of a predetermined number or more of applications among the plurality of applications exceed a predetermined assigned time period, the number of applications for which the one unit of data is generated by the GPU is reduced.

7. The data processing system of claim 1, wherein, in a case where GPU occupation time periods of a predetermined number or more of applications among the plurality of applications exceed a predetermined assigned time period, at least one of the plurality of applications is assigned to another data processing system.

8. The data processing system of claim 7, wherein, in the case where the at least one application is assigned to the other data processing system, (1) the application is started in the other data processing system, (2) context data regarding the application stored in the own system is sent to the other data processing system, and (3) processing of the application in the own system is halted in response to a context switch at a certain timing of the application in the own system as a trigger.

9. The data processing system of claim 1, further comprising:
a coding section, wherein
the GPU generates an image as the one unit of data and stores the generated image in a frame buffer, and,
when instructing the coding section to code the image stored in the frame buffer, the instruction section instructs the GPU to perform the switching.

10. The data processing system of claim 9, wherein the GPU provides, to subsequent processing sections, at least one of the following pieces of data regarding the image stored in the frame buffer: (1) data indicating of which application the image is, (2) data indicating when the image is generated, and (3) data indicating when the image is displayed.

11. The data processing system of claim 1, wherein the instruction section instructs that the switching be performed during a blanking interval while an image is displayed.

12. The data processing system of claim 1, wherein the GPU has at least a computing capability equal to a combined total of respective GPU computing capabilities required by the plurality of applications.

13. The data processing system of claim 1, further comprising:
a CPU adapted to execute the plurality of applications in parallel, the CPU being a central processing unit, wherein
the CPU has at least a computing capability equal to a combined total of respective CPU computing capabilities required by the plurality of applications.

14. The data processing system of claim 13, wherein the CPU executes the plurality of applications in parallel, regardless of a time period assigned to each application in the GPU, in such a manner that resources of the CPU are occupied in parallel by the respective applications.

15. The data processing system of claim 14, further comprising:
command buffers corresponding to the plurality of applications, wherein
the CPU stores a data processing instruction regarding the plurality of applications in the command buffers corresponding to the respective applications, and
the GPU reads out the data processing instruction regarding the plurality of applications from the command buffers.

16. The data processing system of claim 1, further comprising:

a plurality of command buffers corresponding to the plurality of applications and adapted to store a data processing instruction regarding the plurality of applications, wherein, in a case where the application to be executed is to be switched, the GPU switches between the command buffers from which to read out the data processing instruction.

17. The data processing system of claim 16, further comprising: a command buffer different from the plurality of command buffers and adapted to store an instruction for data processing that is able to be performed asynchronously with switching between applications to be executed by the GPU.

18. A data processing method performed by a data processing system, the data processing system including a GPU and an instruction section, the GPU being a graphics processing unit, the data processing method comprising:

performing in a time-divided manner a process of generating a plurality of pieces of data corresponding to a plurality of applications executed in parallel; and instructing the GPU, in a case where the GPU completes a process of generating one unit of data that is data corresponding to a first application and that is to be handed over to subsequent processing sections, to switch to a process of generating an image corresponding to a second application different from the first application, wherein each of the plurality of applications is a computer executable program operating to receive user inputs to facilitate manipulation of a user interactive experience.

19. A non-transitory, computer readable storage medium containing a computer program, which when executed by a data processing system including a GPU and an instruction section, the GPU being a graphics processing unit, causes the data processing system to perform a data processing method by carrying out actions, comprising:

performing in a time-divided manner a process of generating a plurality of pieces of data corresponding to a plurality of applications executed in parallel; and instructing the GPU, in a case where the GPU completes a process of generating one unit of data that is data corresponding to a first application and that is to be handed over to subsequent processing sections, to switch to a process of generating an image corresponding to a second application different from the first application, wherein each of the plurality of applications is a computer executable program operating to receive user inputs to facilitate manipulation of a user interactive experience.

* * * * *